US007758415B2

(12) United States Patent
Kojima

(10) Patent No.: US 7,758,415 B2
(45) Date of Patent: Jul. 20, 2010

(54) SLOT MACHINE

(75) Inventor: Sakiko Kojima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 690 days.

(21) Appl. No.: 11/802,087

(22) Filed: May 18, 2007

(65) Prior Publication Data

US 2007/0287529 A1 Dec. 13, 2007

(30) Foreign Application Priority Data

May 19, 2006 (JP) ............................ 2006-140867

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS

| | | | | |
|---|---|---|---|---|
| 6,190,255 | B1 * | 2/2001 | Thomas et al. | 463/20 |
| 6,517,433 | B2 * | 2/2003 | Loose et al. | 463/20 |
| 7,207,883 | B2 * | 4/2007 | Nozaki et al. | 463/24 |
| 7,404,766 | B2 * | 7/2008 | Adachi et al. | 463/31 |
| 7,628,703 | B2 * | 12/2009 | Wolf et al. | 463/42 |
| 2004/0254015 | A1 * | 12/2004 | Nozaki et al. | 463/31 |
| 2006/0199642 | A1 * | 9/2006 | Okada | 463/30 |
| 2007/0213115 | A1 * | 9/2007 | Fujimoto et al. | 463/16 |
| 2009/0247268 | A1 * | 10/2009 | Yoshizawa | 463/20 |

FOREIGN PATENT DOCUMENTS

JP 2004-173950 A 6/2004

* cited by examiner

*Primary Examiner*—Ronald Laneau
(74) *Attorney, Agent, or Firm*—Arent Fox LLP.

(57) ABSTRACT

A slot machine may comprise: a plurality of display windows in which a plurality of symbols are displayed variably and statically; at least one pay line across the display windows to connect a predetermined number of display windows, a winning combination of symbols being determined by symbol arrangement along the at least one pay line; and the processor operable to: cause the plurality of symbols displayed variably in the display windows; cause the plurality of symbols displayed statically in the plurality of display windows; let a player select an area where at least one symbol is displayed statically and which covers at least partially a display window; cause each symbol displayed statically in the selected area to be replaced with a specific symbol capable of substituting at least another kind of symbol; and determine the winning combination by the symbol arrangement including the replacing specific symbol.

13 Claims, 26 Drawing Sheets

Fig. 11

Probability lottery table for high probability mode
(Random number extraction range: 0 - 65535)

| Winning combination | Random number range | Winning probability |
|---|---|---|
| Bonus | 0 ~ 999 | 1000 / 65536 |
| Wild | 1000 ~ 1009 | 10 / 65536 |
| Snake | 1010 ~ 1499 | 490 / 65536 |
| Treasure box | 1500 ~ 1899 | 400 / 65536 |
| Gold mask | 1900 ~ 2299 | 400 / 65536 |
| Grail | 2300 ~ 2699 | 400 / 65536 |
| Compass and map | 2700 ~ 3099 | 400 / 65536 |
| Ace | 3100 ~ 3899 | 800 / 65536 |
| King | 3900 ~ 4699 | 800 / 65536 |
| Queen | 4700 ~ 5499 | 800 / 65536 |
| Jack | 5500 ~ 6299 | 800 / 65536 |
| 10 | 6300 ~ 10099 | 3800 / 65536 |
| Losing combination | 10100 ~ 65535 | 55436 / 65536 |

Fig. 12

Symbol configuration table

| Symbol position | Symbol | | | | |
|---|---|---|---|---|---|
| | 1st mechanical reel | 2nd mechanical reel | 3rd mechanical reel | 4th mechanical reel | 5th mechanical reel |
| 20 | Bonus | Bonus | Bonus | Bonus | Bonus |
| 19 | Ace | Gold mask | Queen | Ace | 10 |
| 18 | Grail | King | King | Treasure box | Snake |
| 17 | Treasure box | Compass | 10 | Queen | Grail |
| 16 | Queen | Gold mask | King | King | King |
| 15 | 10 | Queen | Treasure box | Gold mask | Treasure box |
| 14 | Grail | Grail | Grail | Bonus | Wild |
| 13 | Gold mask | Jack | Jack | Queen | Queen |
| 12 | 10 | Bonus | Bonus | Snake | Grail |
| 11 | Treasure box | Grail | Treasure box | 10 | Ace |
| 10 | Wild | Ace | Wild | Wild | Wild |
| 9 | Jack | Queen | Compass | 10 | Ace |
| 8 | Gold mask | Wild | Ace | Bonus | 10 |
| 7 | Jack | Ace | 10 | Queen | Treasure box |
| 6 | Grail | Jack | Jack | Compass | Gold mask |
| 5 | Treasure box | King | Grail | Queen | 10 |
| 4 | Ace | Treasure box | Treasure box | King | Treasure box |
| 3 | Queen | Ace | Wild | Queen | Jack |
| 2 | Compass | Grail | Treasure box | Grail | Compass |
| 1 | 10 | Treasure box | King | Ace | Treasure box |
| 0 | King | Queen | Treasure box | Queen | Gold mask |

Fig. 22

Winning payout table for high probability mode

| Winning combination | Payout number | | |
|---|---|---|---|
| | Credit number 1 | Credit number 2 | Credit number 3 |
| Bonus | 0 | 0 | 0 |
| Wild | 50 | 100 | 150 |
| Snake | 30 | 60 | 90 |
| Treasure box | 25 | 50 | 75 |
| Gold mask | 20 | 40 | 60 |
| Grail | 15 | 30 | 45 |
| Compass and map | 10 | 20 | 30 |
| Ace | 5 | 10 | 15 |
| King | 4 | 8 | 12 |
| Queen | 3 | 6 | 9 |
| Jack | 2 | 4 | 6 |
| 10 | 1 | 2 | 3 |

SLOT MACHINE

CROSS REFERENCE TO RELATED APPLICATIONS

This application is based upon and claims the benefits of priority from Japanese Patent Application No. 2006-140867 filed on May 19, 2006, the entire contents of which are incorporated herein by reference.

FIELD OF THE INVENTION

The present invention relates to a slot machine in which a player can select a reel showing a stopped symbol that is replaced with a wild symbol after all reels are stopped in a high probability mode.

RELATED ART

Japanese unexamined patent application publication No. 2004-173950 discloses a slot machine in which a bonus winning can occur easier by substituting a wild symbol for a bonus trigger symbol in a high probability mode.

In the slot machine disclosed in Japanese unexamined patent application publication No. 2004-173950, when the high probability mode game starts, a plurality of symbols shown in a stationary state in a plurality of display areas are displayed variably as they are changed constantly to various kinds of symbols including a wild symbol and the symbols that are displayed variably are stopped again in each display area such that each symbol is displayed statically in each display area. Then, at least one wild symbol is shared to establish a plurality of winning combinations of predetermined symbols and an activated winning line is visually and explicitly displayed, which is related to arranged symbols to establish a plurality of winning combinations or a plurality of winning combinations composed of a predetermined symbol combination.

Although the slot machine disclosed in Japanese unexamined patent application publication No. 2004-173950 may be configured to try to attract the player's interest and enhance the player's expectation to some extent, a symbol column where the symbols are replaced with the wild symbol is selected automatically by the slot machine irrelevant to the player's wish. Therefore, the player has few opportunities to have a feeling that the player is encouraged to participate in or influence the game progress such that the game provides little incentive for the player to devote himself or herself into the game. The slot machine disclosed in Japanese unexamined patent application publication No. 2004-173950 has a lot to improve in order to attract the player's interest and enhance the player's expectation.

SUMMARY OF THE INVENTION

Then, the present invention may be able to attract the player's interest and enhance the player's expectation.

In order to do so, the inventor conceived an idea to encourage the player to participate and provide the player with an opportunity to have a feeling of involving in the game progress so as to provide the incentive to devote himself or herself into the game. The present invention based on such an idea is explained as follows.

According to the present invention, a slot machine as one embodiment may comprise: a plurality of display windows in which a plurality of symbols are displayed variably and statically; at least one pay line across the display windows to connect a predetermined number of display windows, a winning combination of symbols being determined by symbol arrangement along the at least one pay line; and the processor operable to: cause the plurality of symbols displayed variably in the display windows; cause the plurality of symbols displayed statically in the plurality of display windows; let a player select an area where at least one symbol is displayed statically and which covers at least partially a display window; cause each symbol displayed statically in the selected area to be replaced with a specific symbol capable of substituting at least another kind of symbol; and determine the winning combination by the symbol arrangement including the replacing specific symbol along the at least one pay line.

Further features of the present invention, its nature, and various advantages will be more apparent from the accompanying drawings and the following description of the preferred embodiment.

BRIEF DESCRIPTION OF THE DRAWINGS

FIG. 11 is a view showing a configuration of a probability lottery table for the high probability mode.

FIG. 12 is a view showing a symbol configuration table.

FIG. 22 is a view showing a payout table for the high probability mode.

DESCRIPTION OF THE PREFERRED EMBODIMENT

In the following, embodiments of the present invention will be explained in detail with reference to the drawings.

Figure 1:
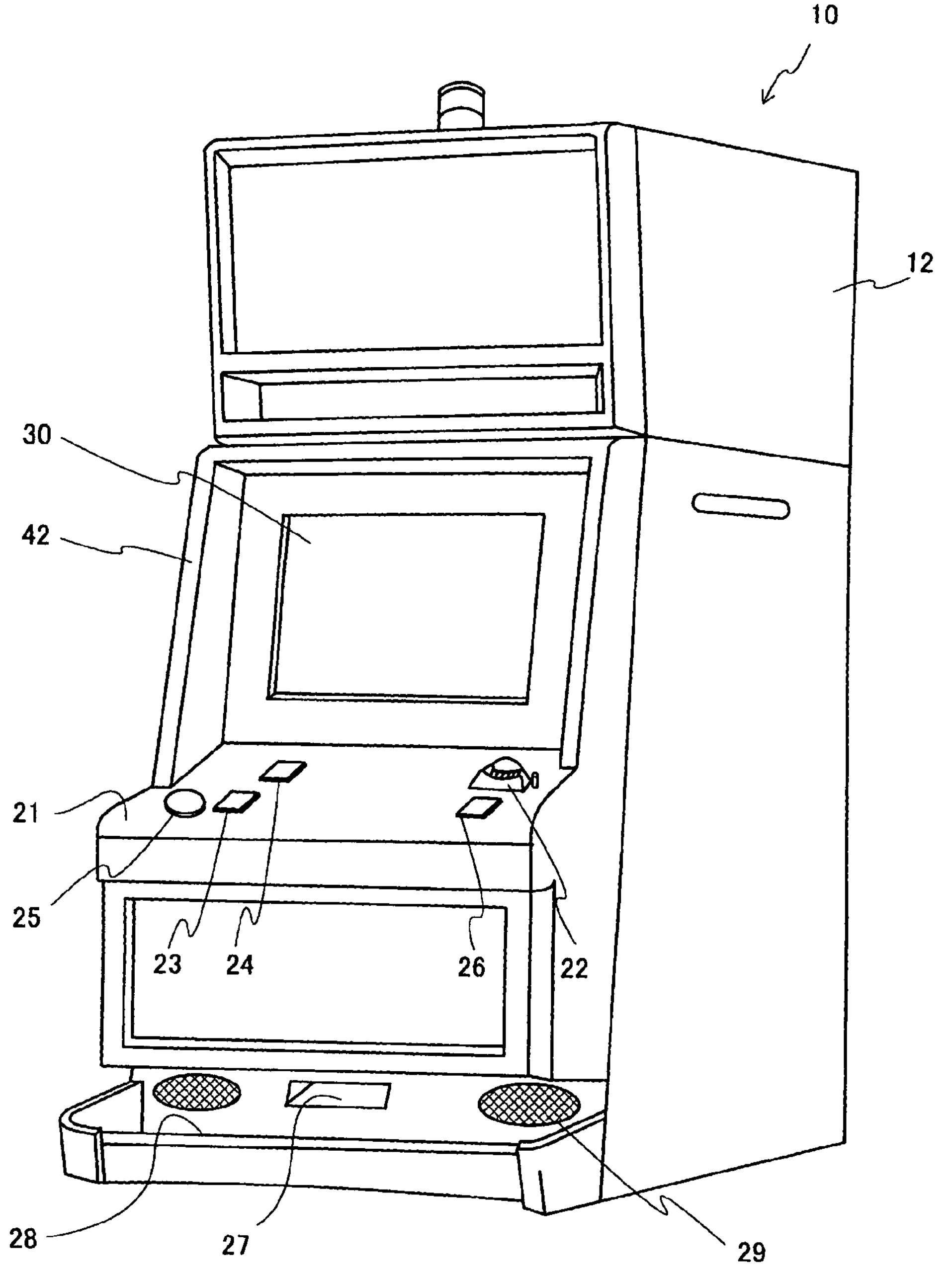
FIG. 1 is a perspective view showing a general appearance of a slot machine of an embodiment according to the present invention.

As shown in FIG. 1, a slot machine 10 related to an embodiment of the present invention comprises: a cabinet 12 and a main door 42.

The cabinet 12 has a face, which can be opened, toward a player and is installed, for example, in a designated place of a casino. Various kinds of component members including a control device 100 (refer to FIG. 7) for electrically controlling the slot machine 10, a hopper 44 (refer to FIG. 7) for controlling the insertion, storage, payout of coins (game media), and the like are provided inside the cabinet 12.

The main door 42 is a member for covering the inside of the cabinet 12 so as not to be exposed outside. This main door 42 is hingedly fixed to the left side if viewed from the front side of the cabinet 12, and an opened state and a closed state can be easily made by turning the main door 42 around the hinge. A liquid crystal display device 30 is provided substantially in the center of the main door 42.

The liquid crystal display device 30 is a means for displaying various kinds of images relating to a game including effect images, information images, and the like, and the player implements the game while confirming visually the various kinds of images displayed on the liquid crystal display device 30. The liquid crystal display device 30 is provided with a transparent liquid crystal panel 34 (refer to FIGS. 4 and 5). Part or all of the transparent liquid crystal panel 34 can be changed to a transparent/nontransparent state, and can display various kinds of images. The detailed configuration of the liquid crystal display device 30 is to be described later.

Five mechanical reels 3A, 3B, 3C, 3D and 3E (refer to FIGS. 2 and 3), each of which has a plurality of kinds of symbols drawn on an outer circumferential surface, are rotatably provided horizontally aligned along a line on the back side of the liquid crystal display device 30. The mechanical reels 3A to 3E comprise a plurality of symbol display means and a plurality of symbol variation control means along with stepping motors 45A, 45B, 45C, 45D and 45E (refer to FIG. 7) to be described later, and a plurality of kinds of symbols necessary for a basic game and including a bonus trigger symbol are drawn on the outer circumferential surface. When the transparent liquid crystal panel 34 turns into the transparent state, various kinds of symbols of each of the mechanical reels 3A to 3E can be recognized visually.

A substantially horizontal operation part 21 is provided on the lower part of the liquid crystal display device 30. A coin insertion opening 22 for inserting a coin in the slot machine 10 is provided on the right side of the operation part 21. On the other hand, a BET switch 23 for determining which of nine pay lines L1, L2, L3, L4, L5, L6, L7, L8, and L9 to be described later are activated, and selecting the number of coins as game media to be bet on the activated pay line (hereinafter simply referred to as "activated line"), and a spin repeat BET switch 24 for playing the game again without changing the number of coins bet in the previous game on the activated line are provided on the left side of the operation part 21. When the BET switch 23 or the spin repeat bet switch 24 is pressed in a press operation, the number of coins on the activated line is determined according to the operation.

In the operation part 21, a start switch 25 as a game start reception means for receiving the start operation of the basic game by the player for each game is provided on the left side of the BET switch 23. The press operation to either the start switch 25 or the spin repeat bet switch 24 is the trigger of the game start, and the rotation of the five mechanical reels 3A to 3E is started in a predetermined mode.

On the other hand, in the operation part 21, a payout switch 26 is provided in the vicinity of the coin insertion opening 22. When the player performs the press operation of the payout switch 26, inserted coins are paid out of a coin payout opening 27 provided in the front lower part of the main door 42, and the paid-out coins are accumulated in a coin receiving tray 28. A sound output opening 29 for propagating sound effects emitted from a speaker 41 installed inside the cabinet 12 (refer to FIG. 7) to the outside of the cabinet 12 is provided above the coin receiving tray 28 on both sides of the coin payout opening 27.

Figure 2:
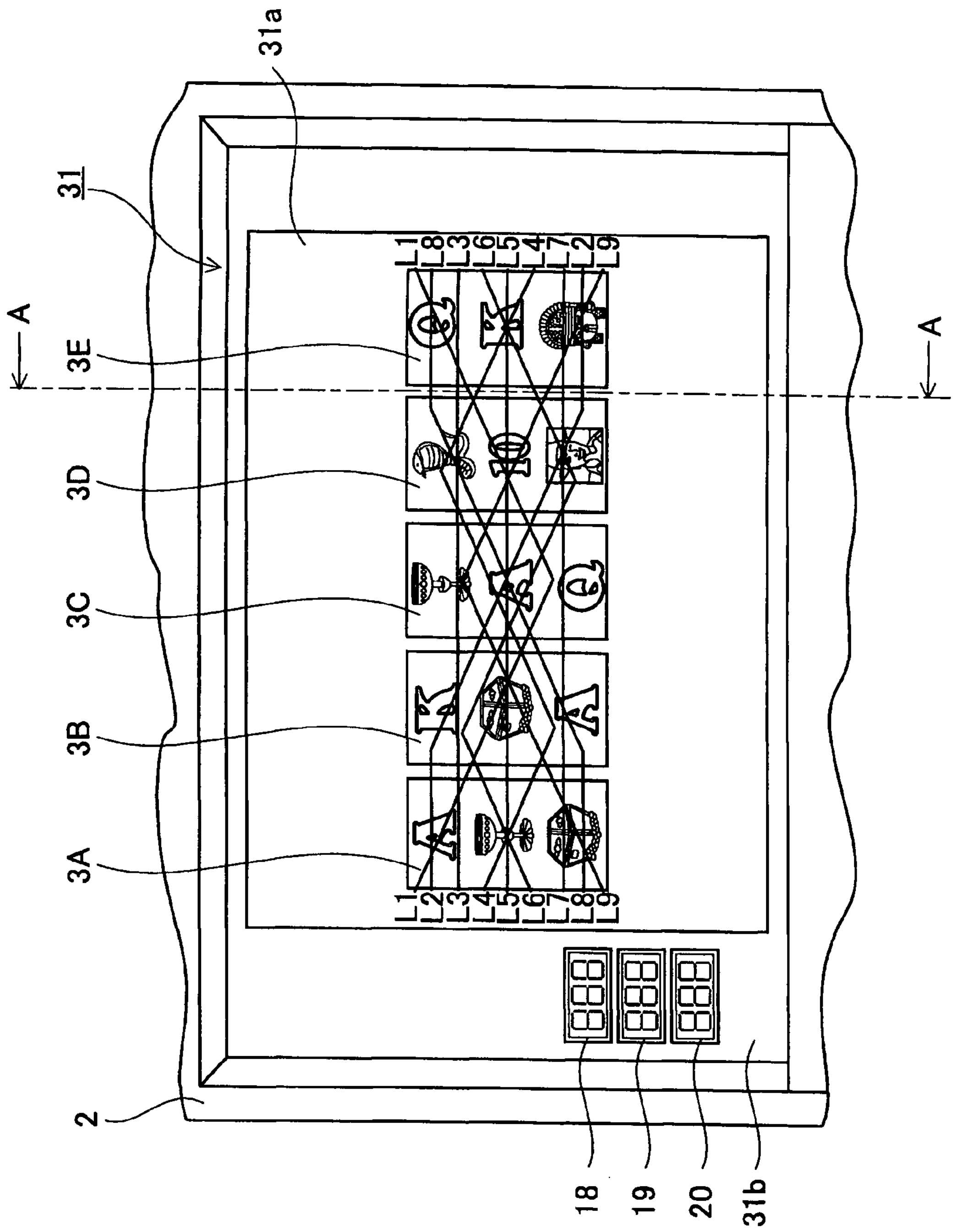
FIG. 2 is an enlarged front view showing a display area of the slot machine.
Figure 4:
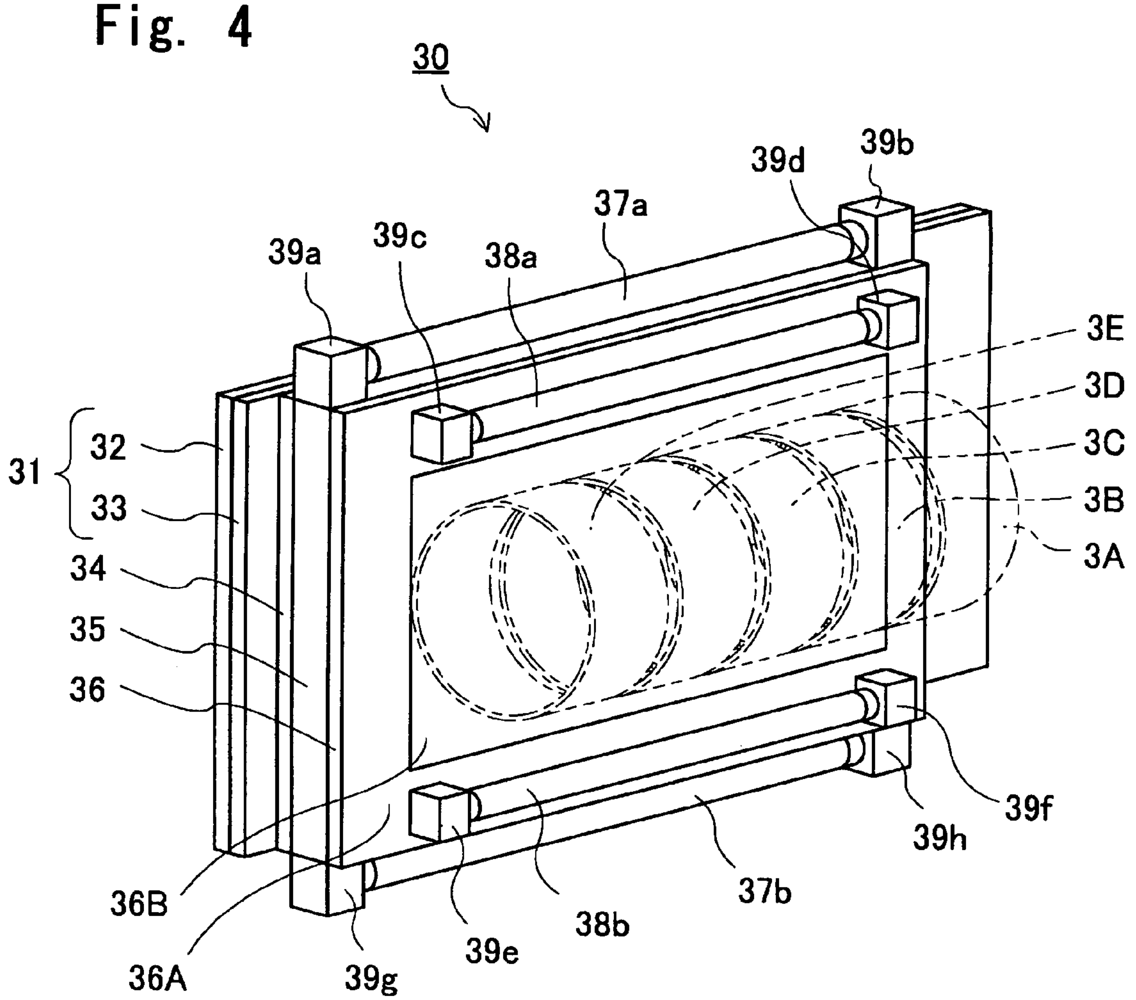
FIG. 4 is a perspective view from the backside showing a general configuration of a liquid crystal display device of the slot machine.
Figure 5:
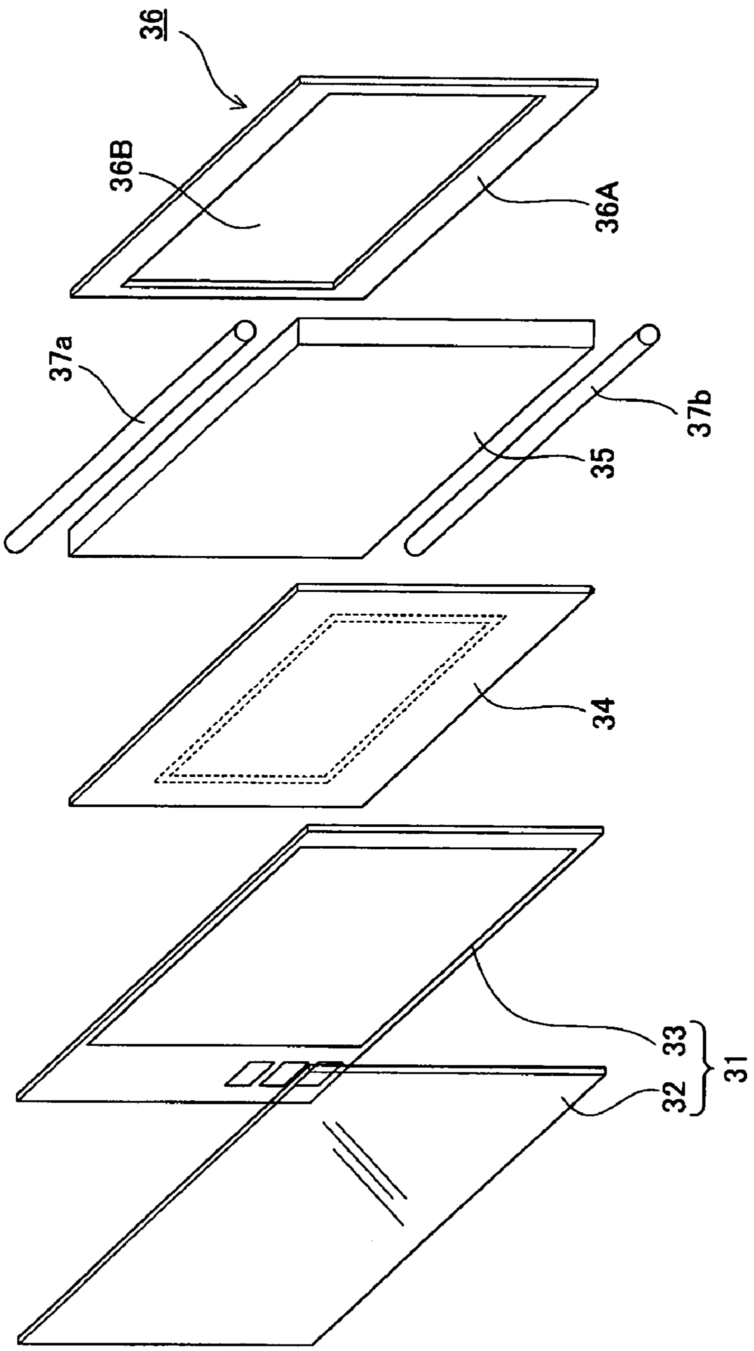
FIG. 5 is an exploded perspective view showing partially a configuration of the liquid crystal display device shown in FIG. 4.

As shown in FIG. 2, the liquid crystal display device 30 includes a front panel 31 and the transparent liquid crystal panel 34 provided on the reverse side of the front panel 31 (refer to FIGS. 4 and 5). The front panel 31 is configured to include a transparent screen 31*a* and a symbol formation area 31*b* in which symbols are formed. Image information displayed on the transparent liquid crystal panel 34 provided on the reverse side of the front panel 31 can be recognized visually via the screen 31*a* of the front panel 31. On the other hand, when the area of the transparent liquid crystal panel 34 which covers the front of the five mechanical reels 3A to 3E is in the transparent state, each symbol of the five mechanical reels 3A to 3E can be recognized visually via the screen 31*a*.

Various kinds of display parts, that is, a payout number display part 18, a credit number display part 19, and a BET number display part 20, are provided in the back side on the left of the liquid crystal display device 30. The symbol formation area 31*b* of the front panel 31 has a transparent portion which covers the front of the various display parts 18 to 20, and the display contents of the various display parts 18 to 20 can be recognized visually.

The slot machine 10 has nine pay lines L1 to L9. Each of the pay lines L1 to L9 extends so as to pass one symbol of each of the mechanical reels 3A to 3E when the rotation of all the mechanical reels 3A to 3E stops.

Specifically, the first pay line L1 extends so as to pass the symbol at the upper position of the first mechanical reel 3A, the symbol at the middle position of the second mechanical reel 3B, the symbol at the lower position of the third mechanical reel 3C, the symbol at the middle position of the fourth mechanical reel 3D, and the symbol at the upper position of the fifth mechanical reel 3E.

The second pay line L2 extends so as to pass the symbols at the upper positions of the first mechanical reel 3A and the second mechanical reel 3B, the symbol at the middle position of the third mechanical reel 3C, and the symbols at the lower positions of the fourth mechanical reel 3D and the fifth mechanical reel 3E.

The third pay line L3 extends in a straight line along a horizontal direction so as to pass the symbols at the upper positions of all the mechanical reels 3A to 3E.

The fourth pay line L4 extends so as to pass the symbol at the middle position of the first mechanical reel 3A, the symbol at the lower position of the second mechanical reel 3B, the symbol at the middle position of the third mechanical reel 3C, the symbol at the upper position of the fourth mechanical reel 3D, and the symbol at the middle position of the fifth mechanical reel 3E.

The fifth pay line L5 extends in a straight line along the horizontal direction so as to pass the symbols at the middle positions of all the mechanical reels 3A to 3E.

The sixth pay line L6 extends so as to pass the symbol at the middle position of the first mechanical reel 3A, the symbol at the upper position of the second mechanical reel 3B, the symbol at the middle position of the third mechanical reel 3C, the symbol at the lower position of the fourth mechanical reel 3D, and the symbol at the middle position of the fifth mechanical reel 3E.

The seventh pay line L7 extends in a straight line along the horizontal direction so as to pass the symbols at the lower positions of all the mechanical reels 3A to 3E.

The eighth pay line L8 extends so as to pass the symbols at the lower positions of the first mechanical reel 3A and the second mechanical reel 3B, the symbol at the middle position of the third mechanical reel 3C, and the symbols at the upper positions of the fourth mechanical reel 3D and the fifth mechanical reel 3E.

The ninth pay line L9 extends so as to pass the symbol at the lower position of the first mechanical reel 3A, the symbol at the middle position of the second mechanical reel 3B, the symbol at the upper position of the third mechanical reel 3C, the symbol at the middle position of the fourth mechanical reel 3D, and the symbol at the lower position of the fifth mechanical reel 3E.

When the BET switch 23 is pressed once, the third pay line L3, the fifth pay line L5, and the seventh pay line L7, for example, are activated, and one coin is taken in as a credit medal.

When the BET switch 23 is pressed twice, the first pay line L1, the fourth pay line L4, and the eighth pay line L8, for example, are activated in addition to the above three lines, and two coins are taken in as credit medals.

When the BET switch 23 is pressed three times, the second pay line L2, the sixth pay line L6, and the ninth pay line L9, for example, are activated in addition to the above six lines, and three coins are taken in as credit medals.

The payout number display part 18 is provided to display the payout number of coins at the time of establishing the winning combination. The credit number display part 19 is provided to display the credit number of coins stored in the slot machine 10. The BET number display part 20 is provided to display the BET number which is the number of coins bet on the activated lines. The various kinds of display parts 18 to 20 are configured to include 7 segment display units. Alternatively, the images of the various kinds of display parts 18 to 20 may be displayed on the transparent liquid crystal panel 34.

Figure 3:
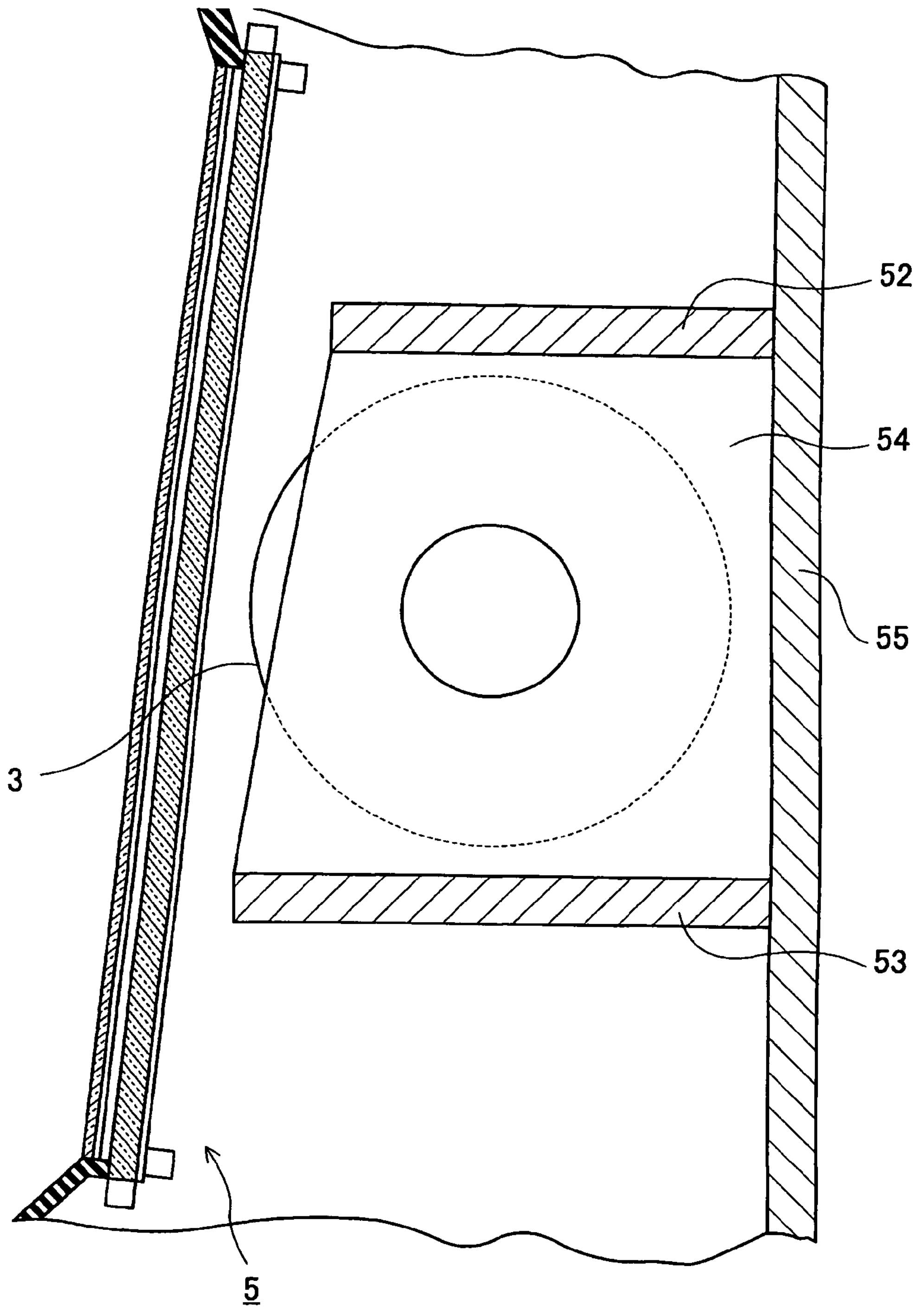
FIG. 3 is a section view along A-A line in FIG. 2.

As shown in FIG. 3, each of the mechanical reels 3A to 3E is rotatably supported by a reel frame 54 independently. Although not illustrated, the stepping motors 45A to 45E for rotating and stopping each of the mechanical reels 3A to 3E (to be described later) are installed in the reel frame 54. The reel frame 54 is installed between an upper frame 52 and a lower frame 53 which are attached to a body frame 55.

As shown in FIGS. 4 and 5, the liquid crystal display device 30 functions as image display means for displaying game images relating to the basic game and a free game. For that reason, the liquid crystal display device 30 comprises the front panel 31 provided with a touch panel 32 and a display plate 33, the transparent liquid crystal panel 34, a light guide plate 35, a reflection film 36, fluorescent lamps 37*a* and 37*b*, and 38*a* and 38*b* which are so-called white light sources, lamp holders 39*a*, 39*b*, 39*c*, 39*d*, 39*e*, 39*f*, 39*g*, and 39*h*, and a table carrier package (TCP) mounted with an integrated circuit for driving the transparent liquid crystal panel. Although the TCP is not shown in FIGS. 4 and 5 in particular, it is composed of a flexible board (not shown) connected to the terminal area of the transparent liquid crystal panel 34, and the like.

The liquid crystal display device 30 is provided in the near side (the near side from the screen 31*a*) from the display area of the mechanical reels 3A to 3E and over the mechanical reels 3A to 3E. The mechanical reels 3A to 3E and the liquid crystal display device 30 are provided at a predetermined interval with each other.

The touch panel 32 is composed of a transparent member. The display plate 33 is composed of a transparent member, and symbols and the like are formed at positions corresponding to areas between the various kinds of display parts 18 to 20 on the display plate 33. That is, the area in which the symbols and the like of the display plate 33 are formed is the symbol formation area 31*b* in the front panel 31, and on the other hand, an area in which the symbols and the like of the display plate 33 are not formed is the screen 31*a* in the front panel 31 (refer to FIG. 2). Alternatively, the symbol formation area 31*b* may not be formed in the front panel 31, and the entire surface of the front panel 31 may be used as the screen 31*a*. In this case, the symbols are not formed on the display plate 33, or the display plate 33 may be omitted.

It is noted for confirmation that electronic circuits for operating various kinds of display parts 18 to 20 arranged on the reverse side of the display plate 33 are not shown in FIGS. 4 and 5.

The transparent liquid crystal panel 34 is formed by enclosing a liquid crystal in a space part between a transparent substrate such as a glass plate in which a thin-film transistor layer is formed, and a transparent substrate facing thereto. The display mode of the transparent liquid crystal panel 34 is set to be normally white. The term "normally white" means that the transparent liquid crystal panel performs a white display in a state where the liquid crystal is not driven (light transmitted through the panel out of the screen can be recognized visually from the outside). Thus, when the transparent liquid crystal panel 34 set to be normally white is adopted, the variable display and the static display of each symbol of the mechanical reels 3A to 3E can be recognized visually even if a situation where the liquid crystal cannot be driven arises. Therefore, the player can continue the game. That is, even if the above situation occurs, the player can play the game utilizing mainly the variable display mode and the static display mode of symbols of the mechanical reels 3A to 3E.

The light guide plate 35 is provided to introduce light from the fluorescent lamps 37*a* and 37*b* into the transparent liquid crystal panel 34 (in other words, illuminates the transparent liquid crystal panel 34), provided on the reverse side of the transparent liquid crystal panel 34, and composed of, for example, a transparent member (having a light guide function) such as acrylic resin having a thickness of approximately 2 cm.

A white polyester film or an aluminum thin film having an evaporated silver film formed thereon, for example, is used as the reflection film 36, and the reflection film 36 reflects light introduced into the light guide plate 35 toward the front side of the light guide plate 35. The reflection film 36 comprises a reflection area 36A and a nonreflection area (transmissive area) 36B. The nonreflection area 36B is formed of a transparent material, and provided in an area including a portion covering the front of the mechanical reels 3A to 3E of the front panel 31.

The fluorescent lamps 37*a* and 37*b* are arranged along the top end and the bottom end of the light guide plate 35, and both of the ends are supported by the lamp holders 39*a* and 39*b*, and 39*g* and 39*h*. Light emitted from the fluorescent lamps 37*a* and 37*b* is reflected on the reflection area 36A of the reflection film 36 and illuminates the transparent liquid crystal panel 34. On the other hand, the fluorescent lamps 38*a* and 38b are arranged facing the mechanical reels 3A to 3E at an upper part position and a lower part position on the reverse side of the reflection film 36, and both of the ends are supported by the lamp holders 39c and 39d, and 39e and 39f. Light which comes out of the fluorescent lamps 38a and 38b is reflected on the surfaces of the mechanical reels 3A to 3E and passes through the nonreflection area 36B as incident light so as to illuminate the transparent liquid crystal panel 34. Thus, in the liquid crystal display device 30, the light emitted from the fluorescent lamps 37a and 37b and further reflected on the reflection area 36A of the reflection film 36, and the light emitted from the fluorescent lamps 38a and 38b, further reflected on the surfaces of the mechanical reels 3A to 3E, passes through the nonreflection area 36B as the incident light so as to illuminate the transparent liquid crystal panel 34. Therefore, the area of the liquid crystal display device 30 corresponding to the nonreflection area 36B of the reflection film 36 is an area which is changed in a transparent or a nontransparent state depending on whether or not the liquid crystal is driven. On the other hand, the area of the liquid crystal display device corresponding to the reflection area 36A of the reflection film 36 is in the nontransparent state irrespective of whether or not the liquid crystal is driven.

In the slot machine 10 according to the present embodiment, only part of area of the screen of the liquid crystal display device 30 is made to be the area which is changed in a transparent or a nontransparent state. However, the entire area of the screen of the liquid crystal display device 30 may be the area which is changed in the transparent or the nontransparent state. Thus, in order to make the entire area of the liquid crystal display device 30 into the area which is changed in a transmissive state or a non-transmissive state, the entire reflection film 36 may be made to be a nonreflection area 36B, or the reflection film 36 may be simply removed. Here, the stransmissive state includes a transparent state, a translucent state, and other state in which light can pass through such that an image can be recognized visually. And the non-transmissive state may mean the state in which light does not pass through such that the image can be recognized with ease.

Figure 6:
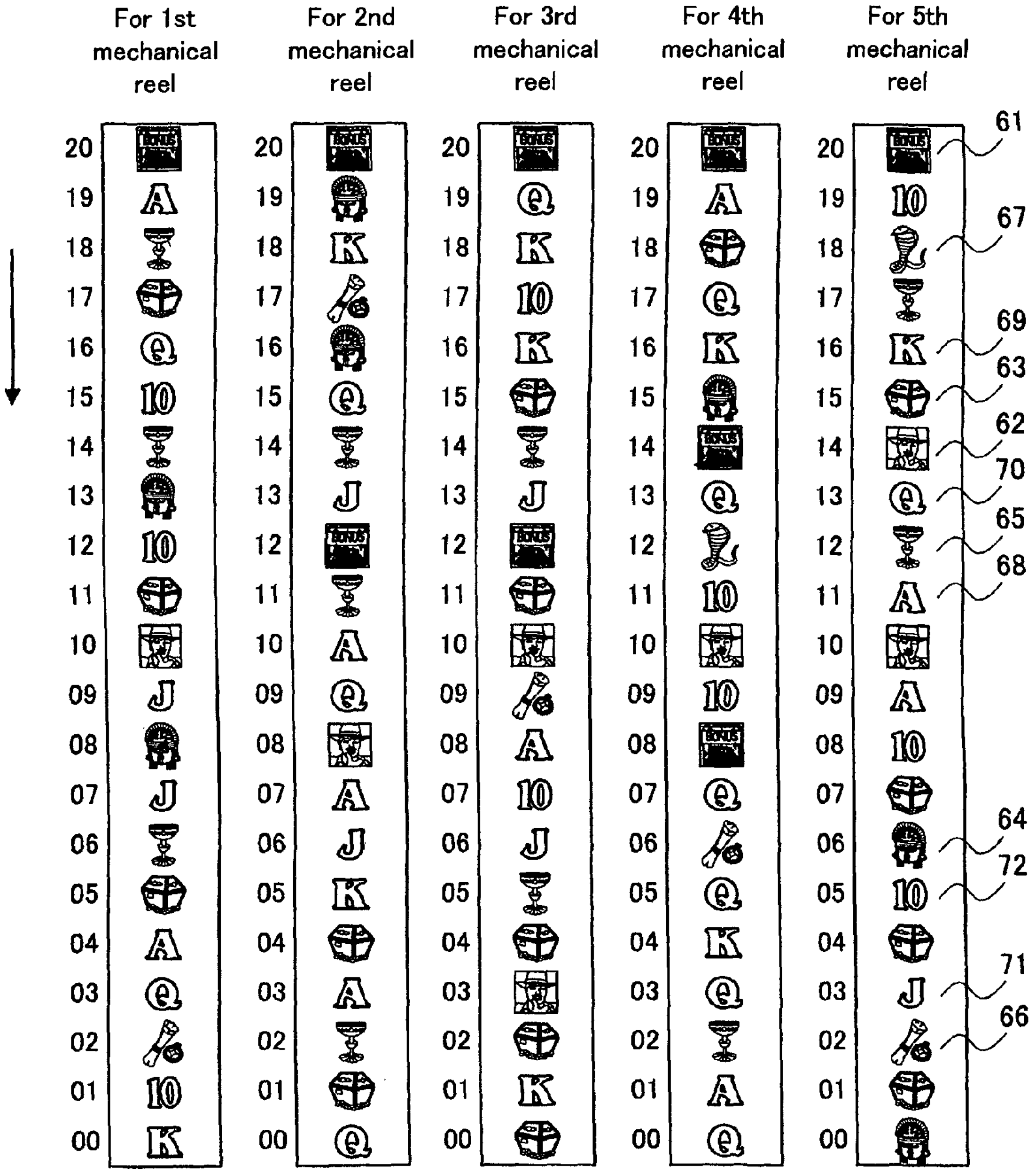
FIG. 6 is a view showing symbol columns appearing on outer faces of mechanical reels.

FIG. 6 shows symbol arrays arranging 21 symbols appearing on each of the mechanical reels 3A to 3E. As shown in FIG. 6, code numbers "00" to "20" are attached to the respective symbols of the mechanical reels 3A to 3E, and the code numbers are tabulated and stored (memorized) in a ROM 108 (FIG. 7) as a data table to be described later. The symbol array is arranged on each of the mechanical reels 3A to 3E, comprising a "BONUS" trigger symbol (symbol 61) (hereinafter abbreviated as a "BONUS") a "Wild" symbol (symbol 62) (hereinafter abbreviated as a "Wild"), a "treasure box" symbol (symbol 63) (hereinafter abbreviated as a "treasure box"), a "gold mask" symbol (symbol 64) (hereinafter abbreviated as a "gold mask"), a "grail" symbol (symbol 65) (hereinafter abbreviated as a "grail"), a "compass and map" symbol (symbol 66) (hereinafter abbreviated as a "compass and map"), a "snake" symbol (symbol 67) (hereinafter abbreviated as a "snake"), an "ace" symbol (symbol 68) (hereinafter abbreviated as an "ace"), a "king" symbol (symbol 69) (hereinafter abbreviated as a "king"), a "queen" symbol (symbol 70) (hereinafter abbreviated as a "queen"), a "jack" symbol (symbol 71) (hereafter abbreviated as a "jack"), and a "10" symbol (symbol 72) (hereinafter abbreviated as a "10". The symbol array of each of the mechanical reels 3A to 3E moves in an arrow direction of FIG. 6, when the reels 3A to 3E rotate in a forward direction (downward).

Here, in the present embodiment, a combination of each of "BONUS", "Wild", "SNAKE", "TREASURE BOX", "GOLD MASK", "GRAIL", "COMPASS AND MAP", "ACE", "KING", "QUEEN", "JACK", and "10" is provided as a winning combination. The combination (combination data) is control information in which a profit (payout number of coins) to be awarded to the player is associated basically with a winning symbol combination, and control information to be used for stop control of each of the mechanical reels 3A to 3E, the switching (shifting) of a game state, the award of coins, and the like.

There are the basic game for aiming to arrange the symbols along the activated lines and the free game having a game mode different from this basic game in the games the player can play in the present embodiment.

Figure 7:
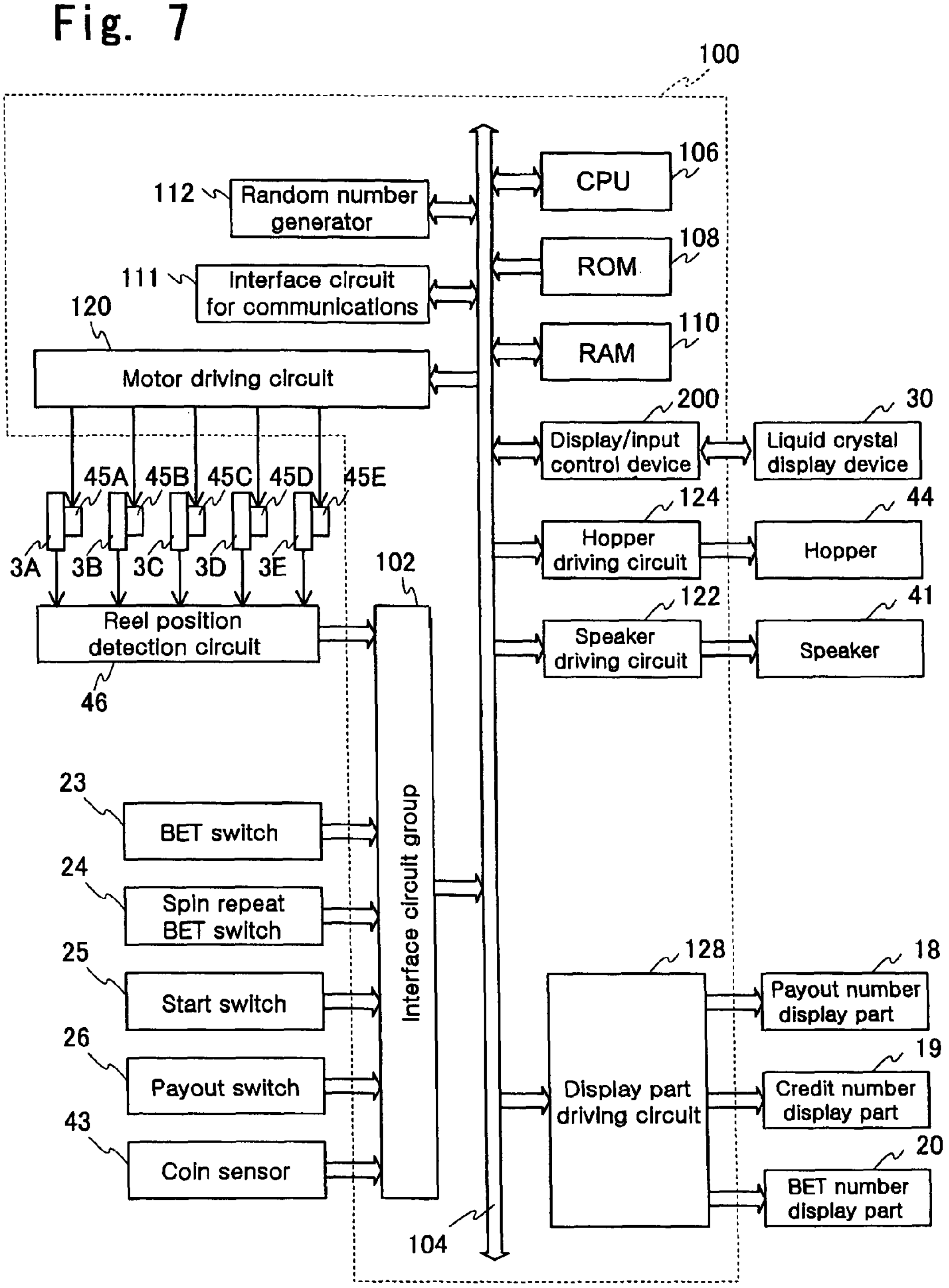
FIG. 7 is a block diagram showing an electronic configuration of a control device of the slot machine.

As shown in FIG. 7, the control device 100 is a microcomputer comprising an interface circuit group 102, an input/output bus 104, a CPU 106, the ROM 108, a RAM 110, an interface circuit for communications 111, a random number generator 112, a motor driving circuit 120, a speaker driving circuit 122, a hopper driving circuit 124, a display part driving circuit 128, and a display/input control unit 200.

The interface circuit group 102 is connected to the input/output bus 104, and the input/output bus 104 inputs or outputs a data signal or an address signal into or from the CPU 106.

The start switch 25 is connected to the interface circuit group 102. A start signal output from the start switch 25 is converted into a predetermined signal in the interface circuit group 102, and then supplied to the input/output bus 104.

The BET switch 23, the spin repeat bet switch 24, and the payout switch 26 are also connected to the interface circuit group 102. Each switching signal output from the switches 23, 24, and 26 is also supplied to the interface circuit group 102, converted into a predetermined signal by the interface circuit group 102, and then supplied to the input/output bus 104.

A coin sensor 43 is also connected to the interface circuit group 102. The coin sensor 43 is a sensor for detecting a coin inserted into the coin insertion opening 22, and provided in association with the coin insertion opening 22. A sensing signal output from the coin sensor 43 is also supplied to the interface circuit group 102 and converted into a predetermined signal by the interface circuit group 102, and then supplied to the input/output bus 104.

A reel position detection circuit 46 is also connected to the interface circuit group 102. The reel position detection circuit 46 is a circuit for detecting the rotational position of each of the mechanical reels 3A to 3E based on a pulse signal from a reel rotational position sensor (not shown), a detection signal from the reel position detection circuit 46 is also supplied to the interface circuit group 102, and converted into a predetermined signal by the interface circuit group 102, and then supplied to the input/output bus 104.

The ROM 108 and the RAM 110 are also connected to the input/output bus 104.

The CPU 106 functions as first game control means. Therefore, upon receiving the start operation of the basic game by the start switch 25, the CPU 106 reads a first game program to execute the basic game. The first game program is programmed such that each of the stepping motors 45A to 45E is driven to rotate all the mechanical reels 3A to 3E, thereby starting the variable display of the symbols of the reels 3A to 3E, and then stopping each drive of the stepping motors 45A to 45E to stop the rotation of all the mechanical reels 3A to 3E, thereby stopping the variable display of the symbols of the reels 3A to 3E, and then when the combination of stopped symbols at that time shows a winning combination, the corresponding number of coins to the winning combination are paid out.

The CPU 106 also functions as second game control means. Therefore, when the symbols of all the mechanical reels 3A to 3E are stopped and displayed statically such that the BONUS trigger symbol or the combination of the symbols appears, the CPU 106 reads a second game program to execute the free game. The second game program is programmed such that a character appears and the character performs a predetermined performance. The specific performance contents of the character in the free game are to be described later in detail.

The ROM 108 stores a control program for totally controlling the slot machine 10, a program for executing a routine shown in FIGS. 9 and 10 (hereinafter referred to as "routine execution program"), initial data for executing the control program, and various kinds of data tables to be used in a lottery. The routine execution program includes the first game program, the second game program, and the like. As examples of the data tables, the tables shown in FIGS. 11, 12, and 22 can be counted.

FIG. 11 shows a probability lottery table used in the high probability mode. In the probability lottery table for the high probability mode, the range of random numbers and a winning probability are associated and registered for each winning combination. Therefore, in the basic game lottery processing to be described later, when a random number within the range of "0" to "999" is extracted from among the random numbers of "0" to "65535", for example, it is determined in the slot machine 10 to generate the BONUS as a final result of the basic game. In other words, a probability that a combination of stopped symbols is determined as a winning combination of BONUS is "1000/65536". On the other hand, when a random number within the range of "10100"to "65535" is extracted from among the random numbers of "0" to "65535", it is determined in the slot machine 10 to generate BLANK (or losing combination) as a final result of the basic game. In other words, a probability that a combination of stopped symbols is determined as the losing combination is "55436/65536".

FIG. 12 shows a symbol configuration table. Each symbol of each of the mechanical reels 3A to 3E is associated with a code number indicating the position of each symbol which forms the symbol array, and registered in the symbol configuration table. That is, the symbol configuration table is provided with information on the symbols drawn on the reel outer circumferential surface and corresponding to the symbol positions (code numbers) of the mechanical reels 3A to 3E.

FIG. 22 shows a winning payout table used in the high probability mode. Each winning combination is associated with the number of coins to be paid out for each credit number bet in one game, and registered in the winning payout table for the high probability mode. Therefore, for example, in the case where the "Wild" occurs in a winning determination, 50 coins are paid out when a bet credit number is "1", 100 coins are paid out when a bet credit number is "2", and 150 coins are paid out when a bet credit number is "3".

Referring back to FIG. 7, the RAM 110 stores temporarily a flag, the values of variables, and the like used by the control program.

The communication interface circuit 111 is also connected to the input/output bus 104. The interface circuit for communications 111 is a circuit for communicating with a server and the like via various kinds of communication line networks including a public telephone line network, a LAN, and the like.

The random number generator 112 for generating random numbers is also connected to the input/output bus 104. The random number generator 112 generates a numeric value in a fixed range, for example, a random number included in the numbers of "0" to "65535 (2 to the power of 16 minus 1)". Alternatively, the random number may be generated by the arithmetic processing of the CPU 106.

The motor driving circuit 120 for driving the stepping motors 45A to 45E and the display part driving circuit 128 for driving the various display parts 18 to 20 are also connected to the input/output bus 104. The CPU 106 controls the operations of the various kinds of display parts 18 to 20 and the stepping motors 45A to 45E via the motor driving circuit 120 and the display part driving circuit 128 in response to the occurrence of a predetermined event.

The speaker driving circuit 122 for driving the speaker 41 is also connected to the input/output bus 104. The CPU 106 reads sound data stored in the ROM 108 and transmits the read sound data to the speaker driving circuit 122 via the input/output bus 104. Thereby, a predetermined sound effect is emitted from the speaker 41.

The hopper driving circuit 124 for driving the hopper 44 is also connected to the input/output bus 104. When a payout signal is input from the payout switch 26, the CPU 106 outputs a driving signal to the hopper driving circuit 124 via the input/output bus 104. Then, the hopper 44 pays out the equivalent number of coins to the remaining number of credits stored in the predetermined memory area of the RAM 110 at the time.

The display/input control unit 200 is also connected to the input/output bus 104. The CPU 106 generates an image display instruction according to a game state and a game result, and outputs the generated image display instruction to the display/input control unit 200 via the input/output bus 104. When the image display instruction from the CPU 106 is input, the display/input control unit 200 generates a driving signal for driving the liquid crystal display device 30 based on the input image display instruction, and outputs the generated driving signal to the liquid crystal display device 30. Thereby, a predetermined image is displayed on the transparent liquid crystal panel 34 of the liquid crystal display device 30. The display/input control unit 200 transmits a signal received by the touch panel 32 on the liquid crystal display device 30 to the CPU 106 via the input/output bus 104 as an input signal.

Figure 8:
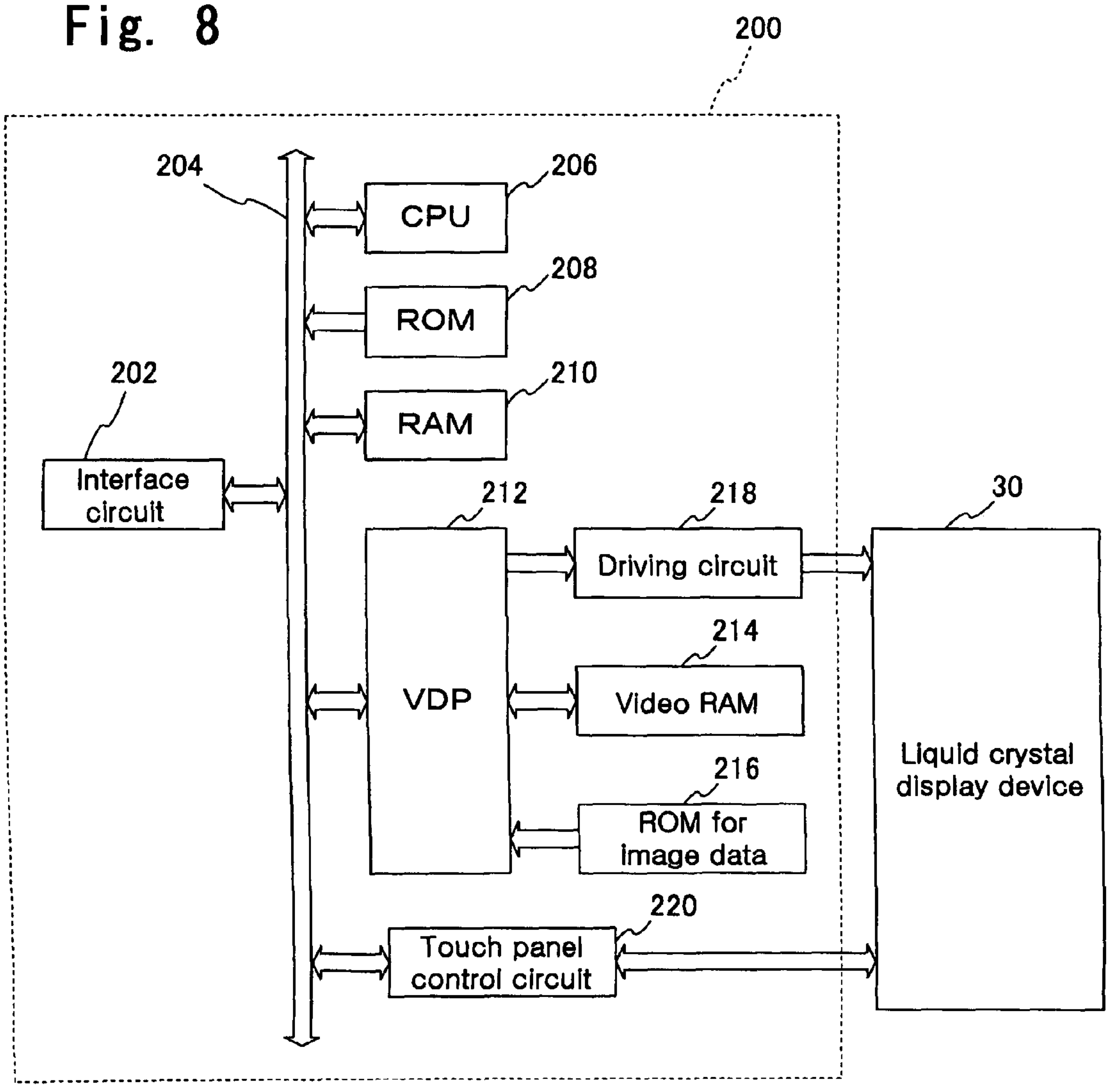
FIG. 8 is a block diagram showing an electronic configuration of display and input control devices of the slot machine.

As shown in FIG. 8, the display/input control unit 200 is a sub-microcomputer for performing image display processing and input control from the touch panel 32, and the display/input control unit 200 comprises an interface circuit 202, an input/output bus 204, a CPU 206, a ROM 208, a RAM 210, a VDP 212, a video RAM 214, a ROM 216 for image data, a driving circuit 218, and a touch panel control circuit 220.

The interface circuit 202 is connected to the input/output bus 204. The image display instruction output from the CPU 106 in the above control device 100 is supplied to the input/output bus 204 via the interface circuit 202. The input/output bus 204 inputs and outputs a data signal or an address signal for the CPU 206.

The ROM 208 and the RAM 210 are also connected to the input/output bus 204. A display control program for generating a driving signal to be supplied to the liquid crystal display device 30 based on the image display instruction from the CPU 106 in the control device 100 side is stored in the ROM 208. On the other hand, the RAM 210 stores a flag or the values of variables used by the display control program.

The VDP 212 is also connected to the input/output bus 204. The VDP 212 is a processor including a so-called sprite circuit, a screen circuit, a pallet circuit, and the like, and capable of performing various processes for displaying images on the liquid crystal display device 30. The video RAM 214 for storing image data corresponding to image display instructions from the CPU 106 in the control device 100, and the ROM 216 for image data storing various kinds of image data including data on the above effect images and the like are connected to VDP 212. The driving circuit 218 which outputs a driving signal for driving the liquid crystal display device 30 is also connected to the VDP 212.

The CPU 206 reads and executes the display control program stored in the ROM 208, thereby causing the video RAM 214 to store image data displayed on the liquid crystal display device 30 in accordance with an image display instruction from the CPU 106 in the control device 100. Various kinds of image display instructions including the display instructions of the effect images and the like are included in the image display instructions.

The ROM 216 for image data stores various kinds of image data including the data on the effect images and the like.

The touch panel control circuit 220 receives a signal caused by a press operation to the touch panel 32 functioning as a touch switch on the liquid crystal display device 30, and transmits the received signal to the CPU 106 via the input/output bus 204.

As clearly shown in the above description, various kinds of processing described in the specification or the drawings are implemented by, in the present embodiment, the ROM 108 storing the routine execution programs, the CPU 106 performing various kinds of control in accordance with the programs stored in the ROM 108, the RAM 110 functioning as the working area of the CPU 106, and the control device 100 including the display/input control unit 200 controlling the drive of the liquid crystal display device 30. The various kinds of processing may also include the contents of the processing executed by the display/input control unit 200 comprising the CPU 206, the ROM 208, the RAM 210, the VDP 212, the video RAM 214, the ROM 216 for image data, the driving circuit 218, and the touch panel control circuit 220. This will be clarified by the flow of the processing operation of the slot machine 10 described by using FIGS. 9 and 10.

Figure 9:
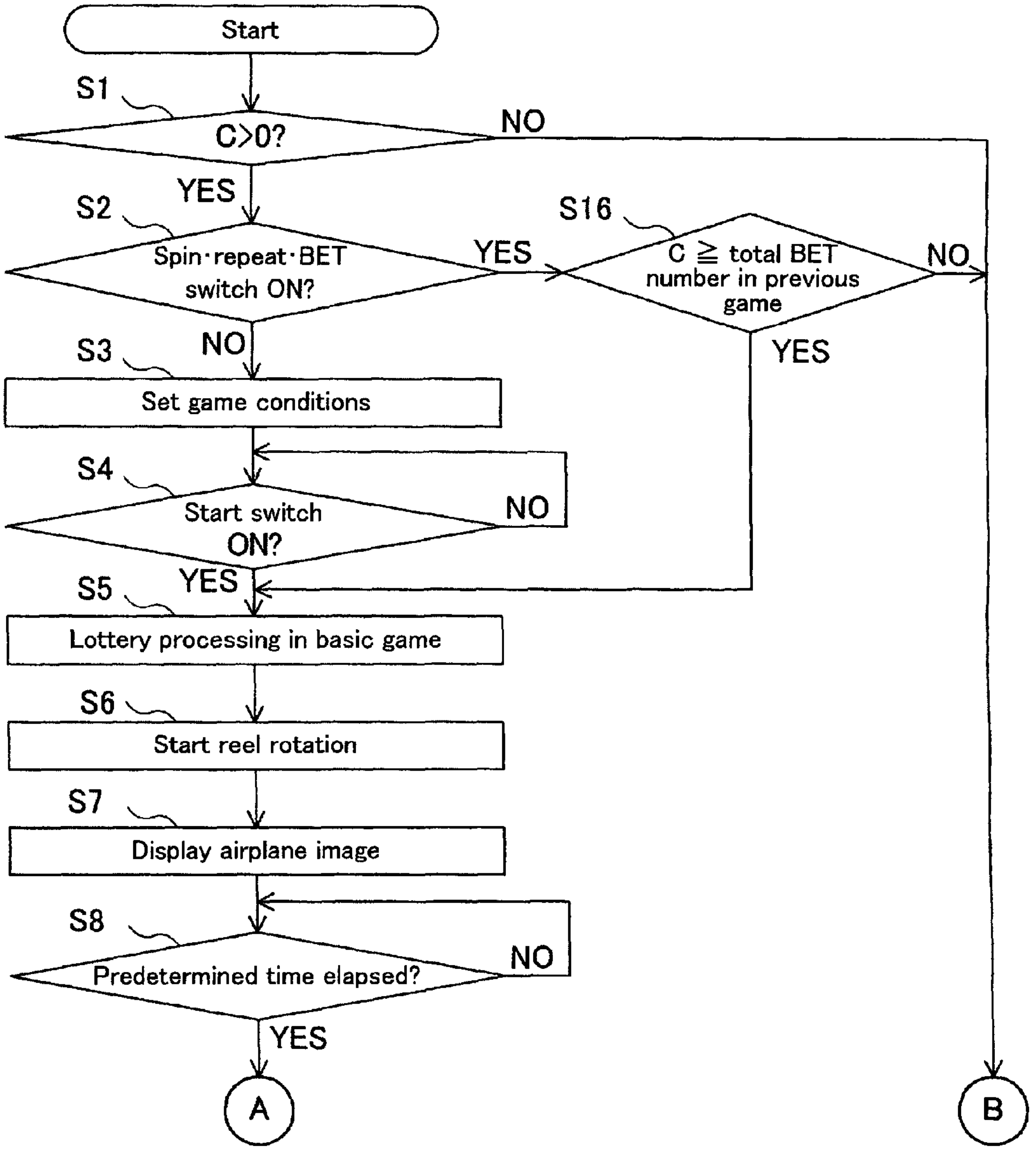
FIG. 9 shows a flowchart of procedures of process operations in a high probability mode in the slot machine.
Figure 10:
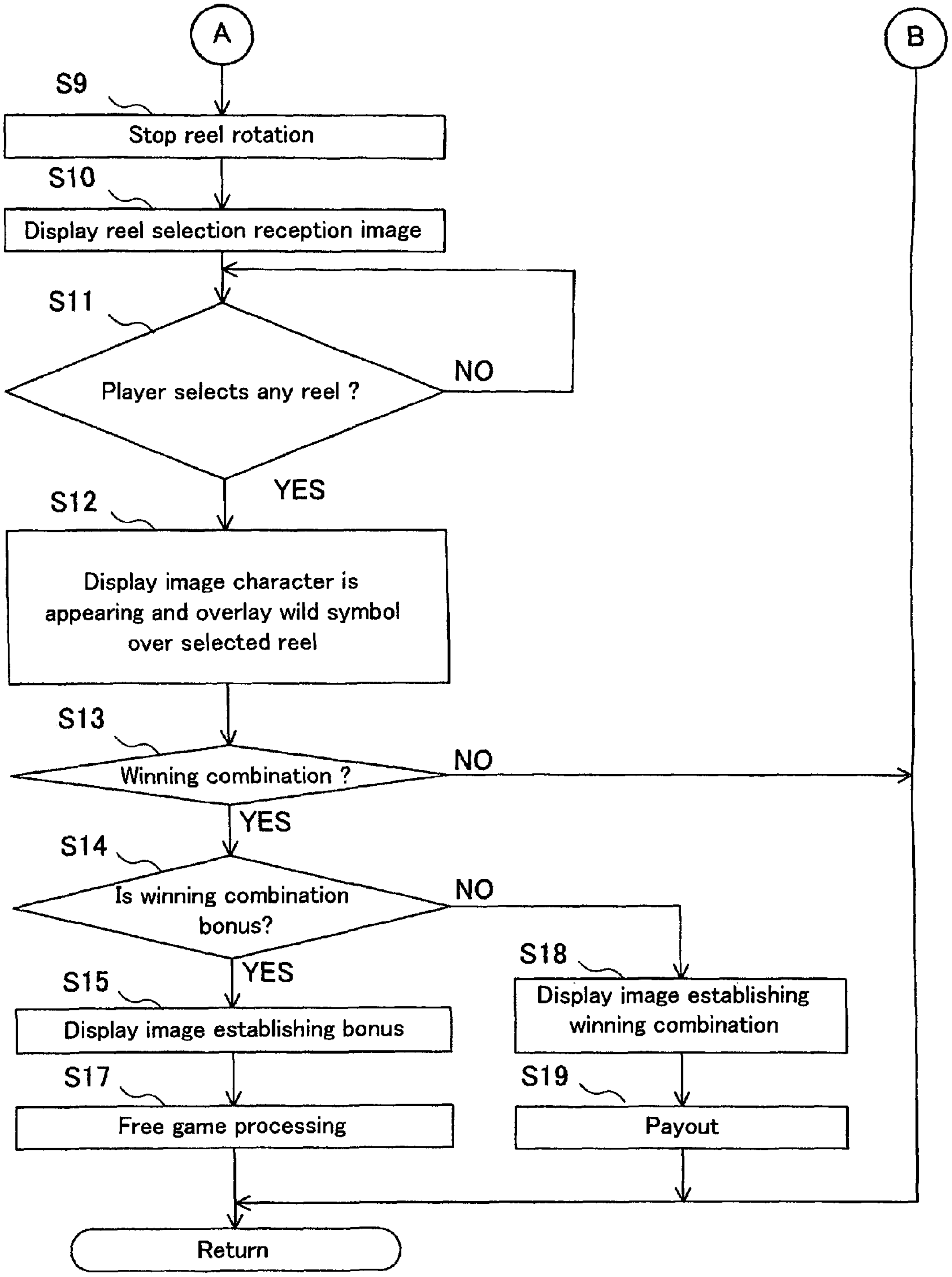
FIG. 10 shows a flowchart of procedures of process operations in a high probability mode in the slot machine.

FIGS. 9 and 10 show routines for controlling the slot machine 10 operated by the control device 100. A series of routines shown in FIGS. 9 and 10 are called and executed at a predetermined timing by the main program of the slot machine 10 executed in advance.

It is assumed in the following that the slot machine 10 is started in advance, and on the other hand, variables used in the CPU 106 in the control device 100 are initialized to be predetermined values, whereby the slot machine 10 is operated in a steady state.

First, a flow of a processing operation in the high probability mode is described with reference to FIGS. 9 and 10.

First, the CPU 106 in the control device 100 determines whether or not a credit which is the remaining number of coins inserted by the player remains (step S1). Specifically, the CPU 106 reads the credit number C stored in the RAM 110, and performs processing based on the read credit number C. When the credit number C is "0" (when determined to be NO in the processing of step S1), a game cannot be started, and the CPU 106 exits the routine without performing processing in any way. On the other hand, when the credit number C is "1" or greater (when determined to be YES in the processing of step S1), the CPU 106 determines that the credit remains and shifts the processing to step S2.

Shifting to step S2, the CPU 106 determines whether or not the press operation of the spin repeat BET switch 24 is performed. When the spin repeat bet switch 24 is pressed and an operation signal from the spin repeat bet switch 24 is input accordingly (when determined to be YES in the processing of step S2), the CPU 106 shifts the processing to step S16. On the other hand, when the operation signal from the spin repeat bet switch 24 is not input even if predetermined time elapses (when determined to be NO in the processing of step S2), the CPU 106 determines that the spin repeat bet switch 24 is not pressed, and shifts the processing to step S3.

Shifting to step S3, the CPU 106 sets game conditions. Specifically, the CPU 106 determines the number of coins bet on the activated lines in this game based on the operation of the BET switch 23. At this time, the CPU 106 receives the operation signal sent by the operation of the BET switch 23, and stores the BET number relating to a pay line to be activated in the predetermined memory area of the RAM 110 based on the number of times of receiving the operation signal. The CPU 106 reads the credit number C written in the predetermined memory area of the RAM 110, subtracts the total BET number added with the BET number from the read credit number C, and stores the subtracted value in the predetermined memory area of the RAM 110. Then, the CPU 106 shifts the processing to step S4.

Shifting to step S4, the CPU 106 waits for the operation of the start switch 25 by determining whether or not the start switch is turned on. When the start switch 25 is operated and an operation signal from the start switch 25 is input accordingly (when determined to be YES in the processing of step S4), the CPU 106 determines that the start switch 25 is operated and shifts the processing to step S5.

On the other hand, shifting to step S16, the CPU 106 determines whether or not the value of the credit number C is equal to or greater than the value of the total number of bets in the last game. In other words, the CPU 106 determines whether or not the game can be started by the press operation of the spin repeat BET switch 24. Specifically, when the spin repeat BET switch 24 is pressed and the operation signal is input from the switch 24 accordingly, the CPU 106 reads the credit number C and the BET number relating to the activated lines L1 to L9 in the last game which are written in the predetermined memory area of the RAM 110, and performs processing based on the mutual relation between the read credit number C and the read BET number, that is based on whether or not the value of the credit number C is equal to or greater than the value of the total number of BETs in the last game. When it is determined that the value of the credit number C is less than the value of the total number of BETs in the last game (when determined to be NO in the processing of step S16), the CPU 106 cannot start the game, and exits the routine without performing processing in any way. On the other hand, when it is determined that the value of the credit number C is equal to or greater than the total number of BETs in the last game (when determined to be YES in the processing of step S16), the CPU 106 subtracts the value of the total number of BETs in the last game from the value of the credit number C, and stores the subtracted value in the predetermined memory area of the RAM 110. Then, the CPU 106 shifts the processing to step S5.

Shifting to step S5, the CPU 106 performs basic game lottery processing by electronic lottery in the slot machine 10 to determine a winning combination. The specific contents of the basic game lottery processing are described below.

In the basic game lottery processing, the CPU 106 first determines the combinations of symbols to be stopped along the activated lines. Specifically, the CPU 106 instructs the random number generator 112 to generate random numbers, and extracts the random numbers in a prescribed range ("0" to "65535" in the present embodiment) generated by the random number generator 112. The CPU 106 stores the extracted random numbers in the predetermined memory area of the RAM 110. Although the random numbers are generated in the random number generator 112 provided outside the CPU 106 in the present embodiment, the random numbers may be generated by the arithmetic processing of the CPU 106 without providing the random number generator 112. The CPU 106 reads the probability lottery table (refer to FIG. 11) and a winning mode table (not illustrated) for the high probability mode which are stored in the ROM 108, and stores the read probability lottery table and the read winning mode table in the predetermined memory area of the RAM 110. The probability lottery table for the high probability mode is prepared for each reel. The CPU 106 reads the probability lottery table and the winning mode table which are stored in the predetermined memory area of the RAM 110, refers to the probability lottery table while taking the random number values written in the predetermined memory area of the RAM 110 as parameters, and determines the combinations of symbols to be stopped on the activated lines. Thus, when the winning combination is determined, the CPU 106 stores determined winning combination data in the predetermined memory area of the RAM 110. The CPU 106 reads the random number values and the winning combination data written in the predetermined memory area of the RAM 110, and determines the combination of symbols to be stopped and displayed based on the read random number values and winning combination data. The symbol configuration table (refer to FIG. 12) stored in the ROM 108 at that time is read, stored in the predetermined memory area of the RAM 110, and referred to by the CPU 106. The CPU 106 stores the stopped symbol data determined as mentioned above in the predetermined memory area of the RAM 110. Alternatively, the stopped symbols may be determined for each reel by using the probability lottery table.

When the combinations of the stopped symbols relating to the activated lines are determined, the CPU 106 determines whether or not the combinations of the stopped symbols relating to the activated lines include the winning combination. When the combinations of the stopped symbols relating to the activated lines include the winning combination, the CPU 106 activates a winning flag indicating a kind of winning combination to generate the win corresponding to the winning combination of symbols on the activated lines. The CPU 106 stores the activated winning flag in the predetermined memory area of the RAM 110. On the other hand, when the combination of the stopped symbols relating to the activated lines is a blank combination (or a losing combination), the CPU 106 does not activate the winning flag.

In the next step S6, the CPU 106 starts the rotation of the mechanical reels 3A to 3E. Specifically, the CPU 106 rotates each of the mechanical reels 3A to 3E one by one or simultaneously based on the symbol configuration table stored in the RAM 110.

After the rotation of the mechanical reels 3A to 3E starts, the CPU 106 counts the number of driving pulses transmitted to each of the stepping motors 45A to 45E, and stores the count values in the predetermined memory area of the RAM 110. A reset pulse is acquired whenever each of the mechanical reels 3A to 3E rotates, and the reset pulse of each of the mechanical reels 3A to 3E is input into the CPU 106 via the reel position detection circuit 46. The driving pulse count values written in the RAM 110 are cleared by the reset pulses obtained thus and set to "0". Then, the count value corresponding to the rotational position of each of the mechanical reels 3A to 3E within one revolution is stored in the predetermined memory area of the RAM 110. In the symbol configuration table stored in the RAM 110, each rotational position of the mechanical reels 3A to 3E is associated with each symbol of the mechanical reels 3A to 3E. When the CPU 106 refers to the symbol configuration table, the CPU 106 associates a code number sequentially given for each fixed rotation pitch of each of the mechanical reels 3A to 3E, with the symbol code indicating the symbol provided corresponding to each code number based on the rotational position at which the reset pulse is generated.

When the rotation of the mechanical reels 3A to 3E is started, the CPU 106 performs processing of displaying the image of an airplane 81 on the screen 31*a* of the liquid crystal display device 30 (step S7). An image as shown in FIG. 13 can be displayed on the screen 31*a* of the liquid crystal display device 30 by performing the processing in step S7.

Figure 13:
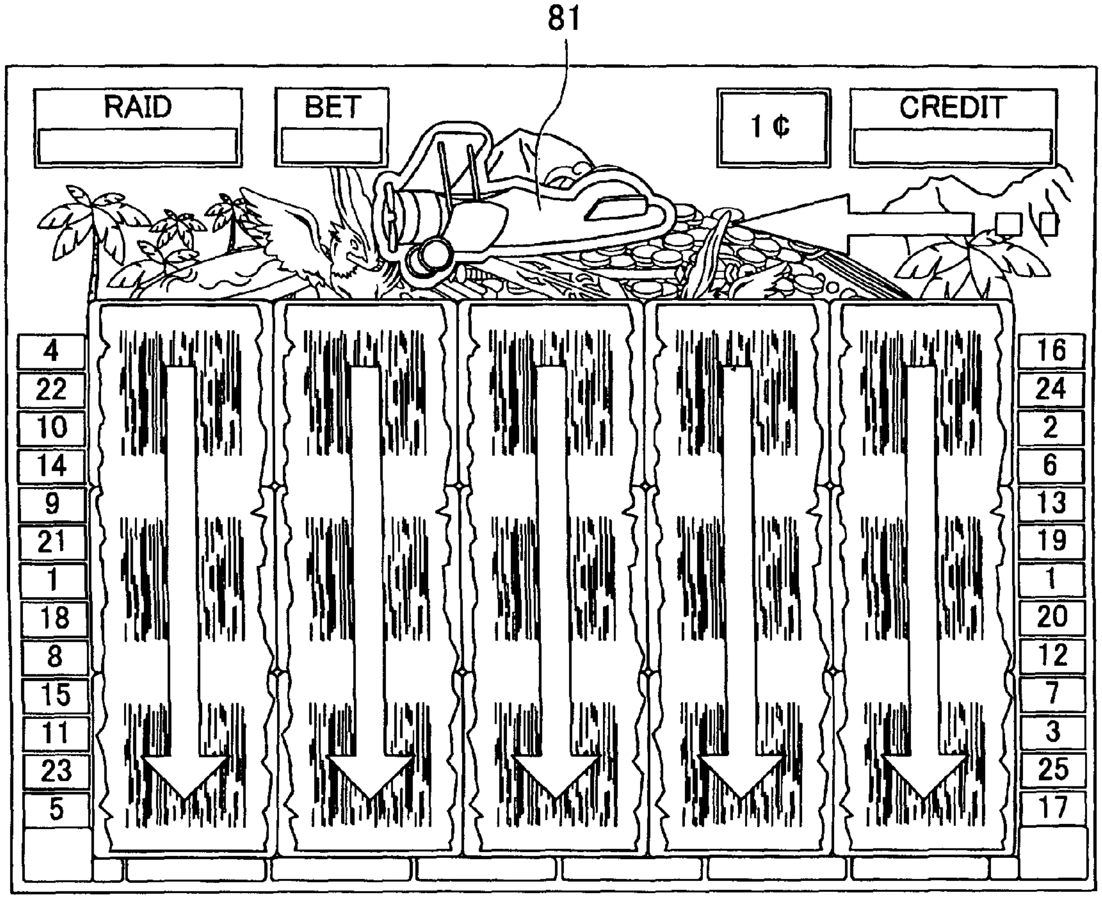
FIG. 13 is a view showing a replacement suggestion screen to replace symbols with a wild symbol.

FIG. 13 shows an aspect in which the CPU 106 causes the liquid crystal display device 30 to display the image of the airplane 81 flying on the upper part of the screen 31*a* during the rotation of the mechanical reels 3A to 3E. When the CPU 106 displays, on the liquid crystal display device 30, the image showing that the airplane 81 flies, the liquid crystal display device 30 suggests that the player can replace one reel with the Wild symbol after the mechanical reels 3A to 3E stop. The speaker 41 outputs the flight sound "zoom!!" of the airplane as a sound effect in synchronization with the display of the image of the airplane 81.

Here, the "Wild symbol" may be used as a symbol containing the meaning of a "specific symbol that is determined in advance to be constituted as any winning combinations" in addition to the above.

Here, in the embodiment of the present invention, the CPU 106 may be configured to receive the player's selection of the reel to be replaced with the Wild symbol for each game, or it may be determined whether or not the player can select the reel to be replaced with the Wild symbol by an internal lottery at the start of the game. Further, the CPU 106 may perform the internal lottery in each game. Alternatively, the internal lottery may be conducted in a regular manner such as every other game, for example, or may be conducted in an irregular manner such as being conducted at random.

Thereafter, the CPU 106 waits for a predetermined period of time to elapse (step S8). When the predetermined period of time elapses (at the time when it is determined to be YES in the processing of step S8), the CPU 106 stops automatically the rotation of each of the mechanical reels 3A to 3E (step S9). Specifically, based on the winning combinations written in the predetermined memory area of the RAM 110, the CPU 106 stops the rotation of each of the mechanical reels 3A to 3E one by one or simultaneously so that the stopped symbols corresponding to the winning combination determined in step S5 are displayed in a display area having a visually interactive relationship with the player.

When the rotation of all the mechanical reels 3A to 3E stops, the CPU 106 performs processing of displaying an image for receiving the selection of a reel on the screen 31*a* of the liquid crystal display device 30 (step S10). When the processing of step S10 is performed, an image as shown in FIG. 14 (FIG. 18 when the BONUS occurs) can be displayed on the screen 31*a* of the liquid crystal display device 30.

Figure 14:
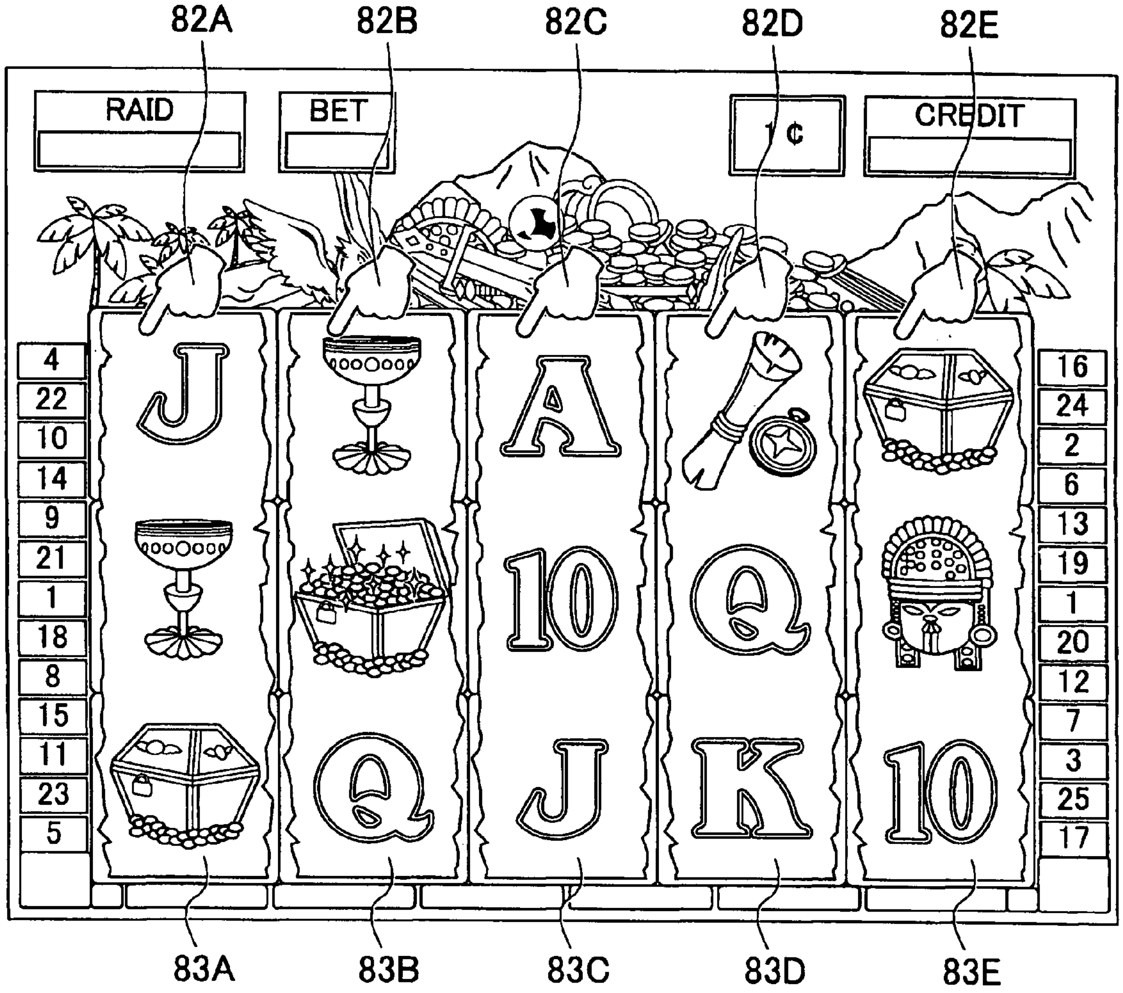
FIG. 14 is a view showing a reel selection screen.
Figure 18:
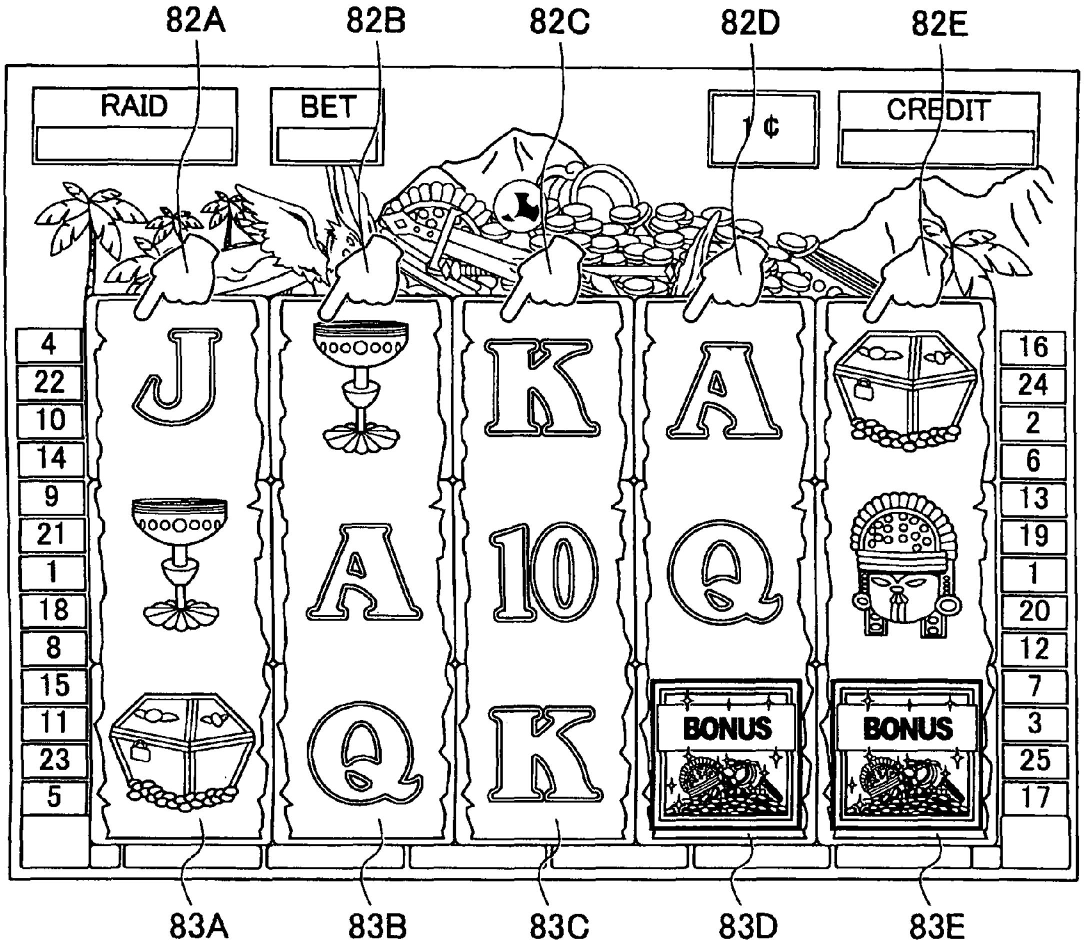
FIG. 18 is a view showing a reel selection screen.

FIGS. 14 and 18 show an aspect indicating that the CPU 106 receives the selection of a reel to be replaced with the Wild symbol by the player via the screen 31*a*, after the mechanical reels 3A to 3E stop. The CPU 106 causes the liquid crystal display device 30 to display hand images (or hand marks) 82A to 82E on the screen 31*a* so as to touch the static display areas 83A to 83E of each reel. Therefore, the screen 31*a* can function as the touch panel 32, and the CPU 106 can receive the selection of the reel to be replaced with the Wild symbol when the player presses the static display areas 83A to 83E of each reel.

Thus, the player can recognize that the screen 31*a* functions as a touch switch (touch panel 32), and a reel to be replaced with the Wild symbol can be selected by touching the static display areas 83A to 83E of each reel with the finger. After the processing of step S10 is completed, the CPU 106 shifts the processing to step S11.

Shifting to step S11, the CPU 106 determines whether or not any one of reels is selected by the operation of the player via the touch panel 32. When the determination is YES, the CPU 106 shifts to step S12, and when the determination is NO, the CPU 106 repeats the processing of step S11 until it is determined to be YES.

Shifting to step S12, the CPU 106 performs processing of displaying an image in which a character is made to appear on the screen 31*a* of the liquid crystal display device 30. By performing the processing of step S12, images as shown in FIGS. 15 and 16 (FIGS. 19 and 20 when the BONUS occurs) can be displayed on the screen 31*a* of the liquid crystal display device 30.

Figure 15:
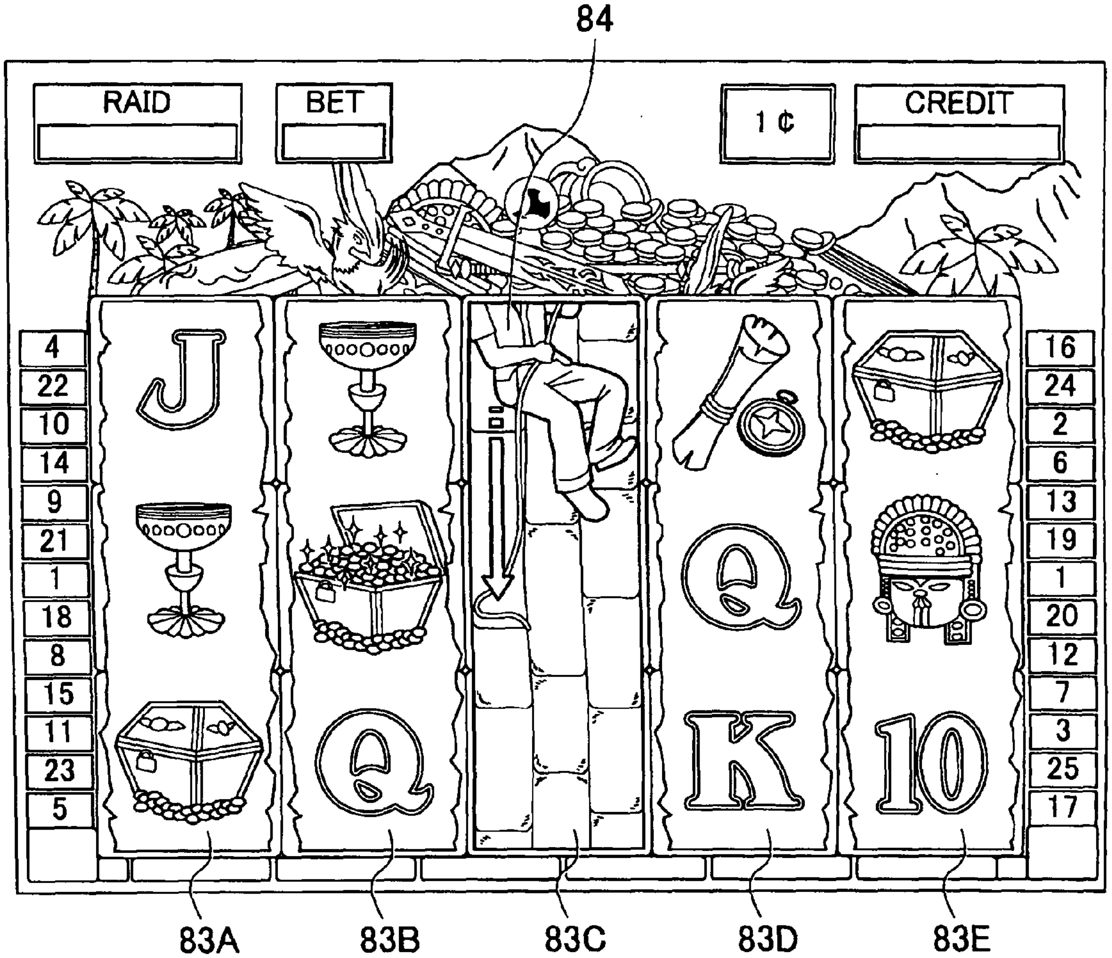
FIG. 15 is a view showing a character appearing screen.

FIG. 15 (FIG. 19 when the BONUS occurs) shows an aspect indicating that the CPU 106 causes the liquid crystal display device 30 to display, on the static display area 83C, the image in which a character 84 appears when the CPU 106 receives the selection of a third reel by the player in FIG. 14 (FIG. 18 when the BONUS occurs). When the CPU 106 causes the liquid crystal display device 30 to display the image in which the character 84 comes down on the static display area 83C by using a rope ladder, the player can recognize that the selection operation is effective. The speaker 41 outputs a sound "floomp!!" of the rope ladder as a sound effect in synchronization with the display of the image in which the character 84 appears.

Figure 16:
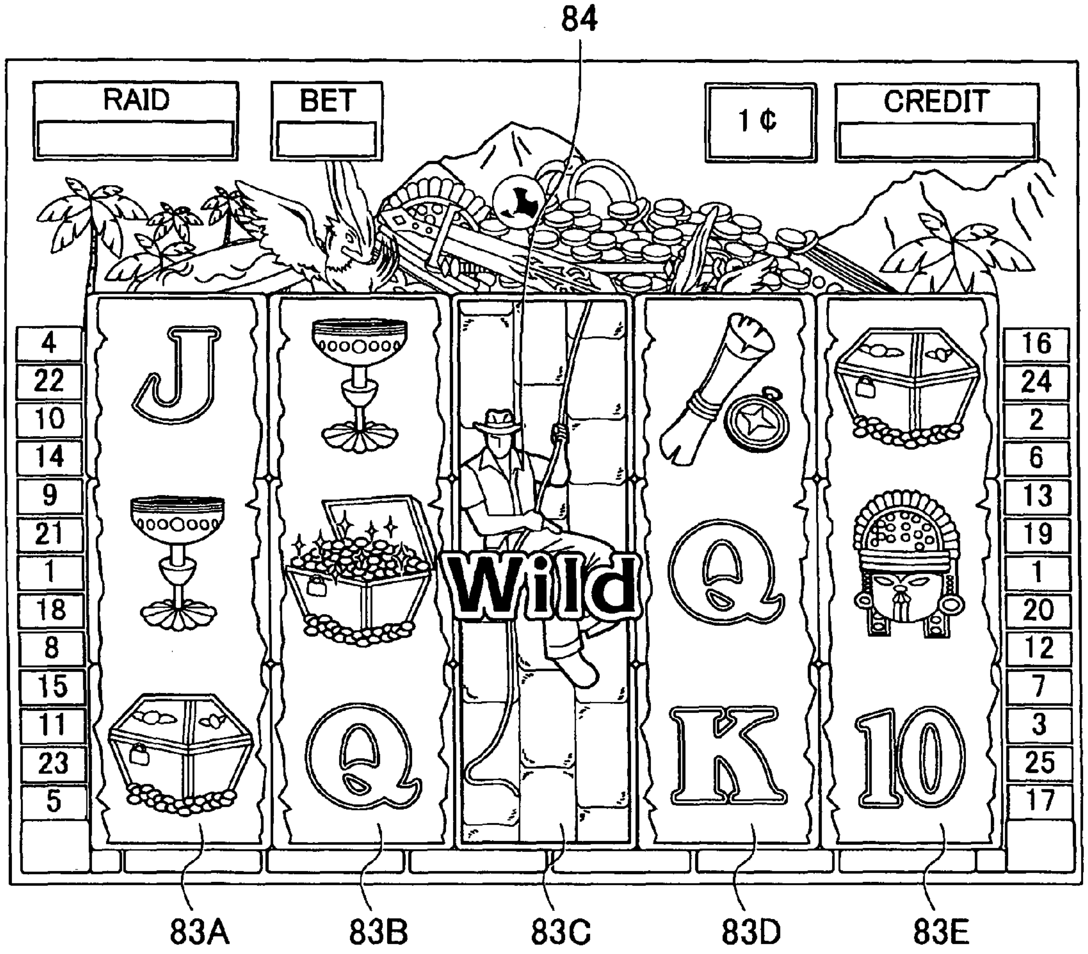
FIG. 16 is a view showing a screen displaying a wild symbol.
Figure 20:
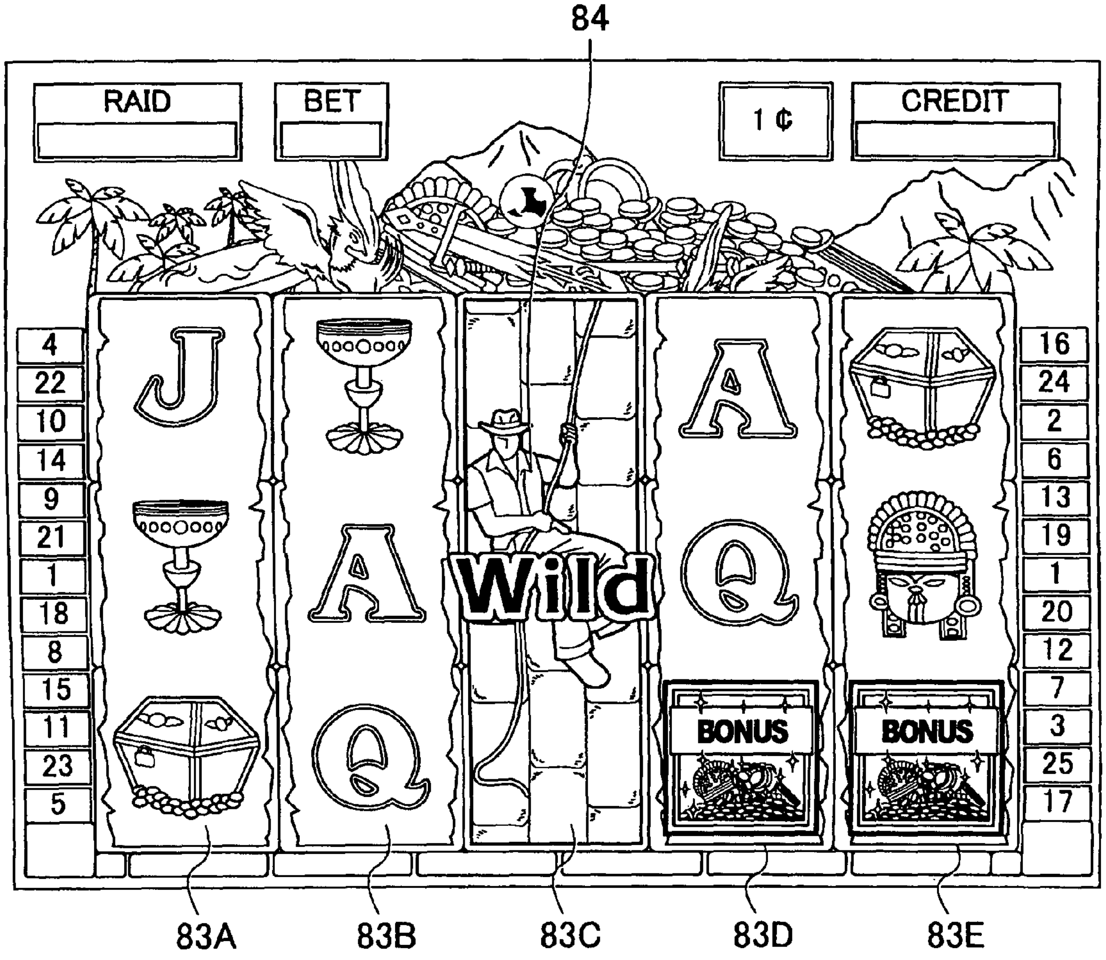
FIG. 20 is a view showing a screen displaying a wild symbol.

When the character 84 climbs down using the rope (or rope ladder) and the character's foot reaches a predetermined position (e.g., the ground), the CPU 106 causes the liquid crystal display device 30 to display a Wild display screen as shown in FIG. 16 (FIG. 20 when the BONUS occurs).

Figure 19:
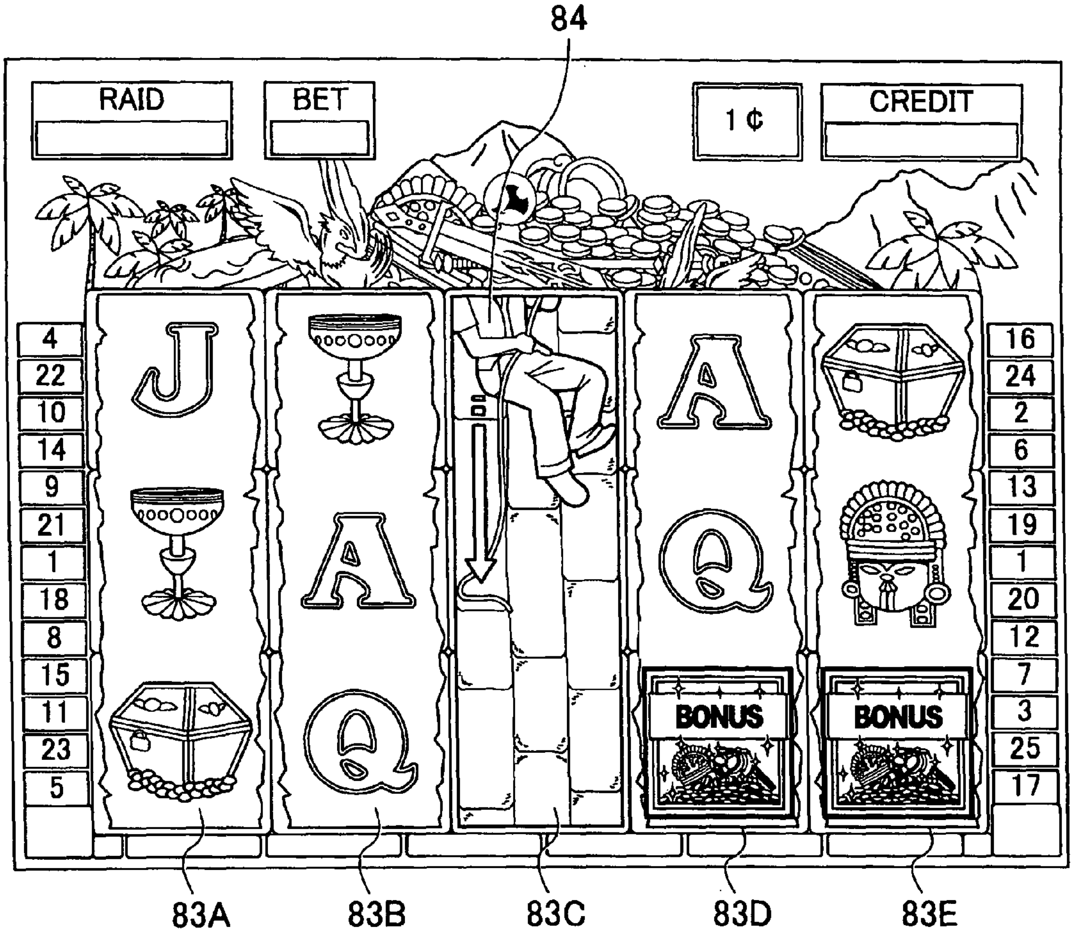
FIG. 19 is a view showing a character appearing screen.

FIG. 16 (FIG. 20 when the BONUS occurs) shows an aspect indicating that the CPU 106 causes the liquid crystal display device 30 to display "Wild" along with the character 84 on the static display area 83C when the character 84 climbs down using the rope (or rope ladder) and the character's foot reaches the predetermined position (e.g., the ground) in FIG. 15 (FIG. 19 when the BONUS occurs). Thus, the player can recognize that the entire third reel is replaced with the Wild symbol. The speaker 41 outputs a sound indicating the appearance of a hero "ta-dah!!" as a sound effect along with the character 84 in synchronization with the display of the image in which the "Wild" appears. After the processing of step S12 is completed, the CPU 106 shifts the processing to step S13.

Shifting to step S13, the CPU 106 determines whether or not the winning combination is realized (step S13). Specifically, the CPU 106 makes the determination based on the state of the winning flag relating to the activated lines stored in the predetermined memory area of the RAM 110. When the winning flag is not activated (when it is determined to be NO in the processing of step S13), the CPU 106 determines that the winning combination is not realized and exits the present routine. On the other hand, when the winning flag is activated (when it is determined to be YES in the processing of step S13), the CPU 106 determines that the winning combination is realized and shifts the processing to step S14.

Shifting to step S14, the CPU 106 determines whether or not the realized winning combination is a combination which allows a shift to the free game, that is, the "BONUS". Specifically, the CPU 106 makes the determination based on the kind of the winning flag stored in the RAM 110. When an activated winning flag is a flag indicating the "BONUS" winning (when it is determined to be YES in the processing of step S14), the CPU 106 determines that a game state should be shifted to the free game, and shifts the processing to step S15. On the other hand, when the activated winning flag is a flag indicating the win other than the "BONUS" (when it is determined to be NO in the processing of step S14), the CPU 106 determines that the corresponding number of coins to the winning combination should be paid out, and shifts the processing to step S18.

Figure 17:
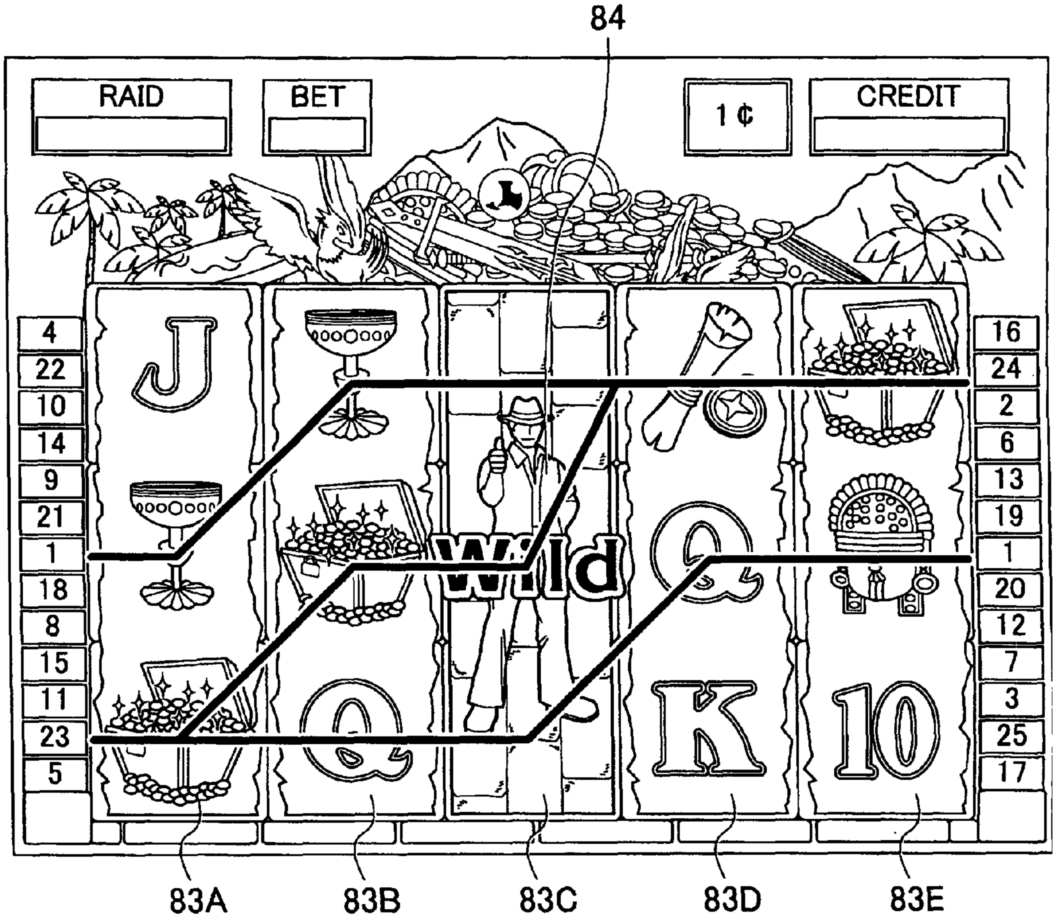
FIG. 17 is a view showing a screen displaying winning combinations.

Shifting to step S18, the CPU 106 performs processing of causing the liquid crystal display device 30 to display an image in which the activated lines as shown in FIG. 17 are realized on the screen 31*a*, and then the CPU 106 shifts the processing to step S19.

FIG. 17 shows an aspect indicating that the CPU 106 causes the liquid crystal display device 30 to display the pay lines when the CPU 106 receives the selection for replacing the third reel with the Wild symbol by the player. Here, the Wild symbol is a symbol replacing any kind of symbol. Therefore, when one symbol is insufficient for winning on an activated line, a winning combination is realized by combining a remaining symbol with the Wild symbol.

Although the lines L1 to L9 are designated as the activated lines as shown in FIG. 2, when all the stopped symbols of one reel are replaced with the Wild symbol, all the symbols of the right, the upper right, the lower right, the left, the upper left, and the lower left seen from each symbol of each reel may be included in the activated lines. However, the upper right symbol represents an upper symbol of a symbol on the right, and the lower right symbol shows a lower symbol of a symbol on the right. The upper left and the lower left are the same as above.

Thus, the activated pay lines as shown in FIG. 17 are realized as a result. The speaker 41 outputs a hero's voice "Yay!!" in synchronization with the display of the image in which the pay lines appear.

Since the player can select a reel to be replaced with the Wild symbol, the winning combination changes depending on the reel to be selected. Therefore, by trying to get the winning combination so as to get more game media, the player can play the game with an interest and a feeling of expectation.

Here, if the CPU 106 does not receive the selection operation of the reel by the player within a predetermined time limit, each symbol may not be replaced with the Wild symbol on the reel selection screen of FIG. 14.

Thus, since the player thinks hard that the player should replace which reel with the Wild symbol within the limited time to get the winning combination so as to get more game media, the player can play the game with more interests and more feelings of expectation.

Here, depending on the game, there is a case in which game media to be acquired by the player do not increase even how the replacement to the Wild symbol is performed (when the replacement to the Wild symbol is unnecessary). Since the number of acquired game media is constant even if the player selects a reel replaced with the Wild symbol within the limited time or does not perform the selection, the player would think of not selecting as well as selecting better to acquire more payouts. Therefore, there is a possibility that the player can further enjoy the game to which such another kind of game property is added.

Shifting to step S19, the CPU 106 pays out the number of coins corresponding to the winning combination other than the "BONUS" in a predetermined mode. Specifically, the CPU 106 calculates the payout number of coins corresponding to the winning combination with reference to the winning payout table for the high probability mode (refer to FIG. 22). The CPU 106 reads the credit number stored in the predetermined memory area of the RAM 110, adds the calculated payout number to the read credit number, and stores the additional value in the predetermined memory area of the RAM 110. The CPU 106 displays the stored value on the credit number display part 19. After the completion of the processing in step S19, the CPU 106 exits the routine.

Figure 21:
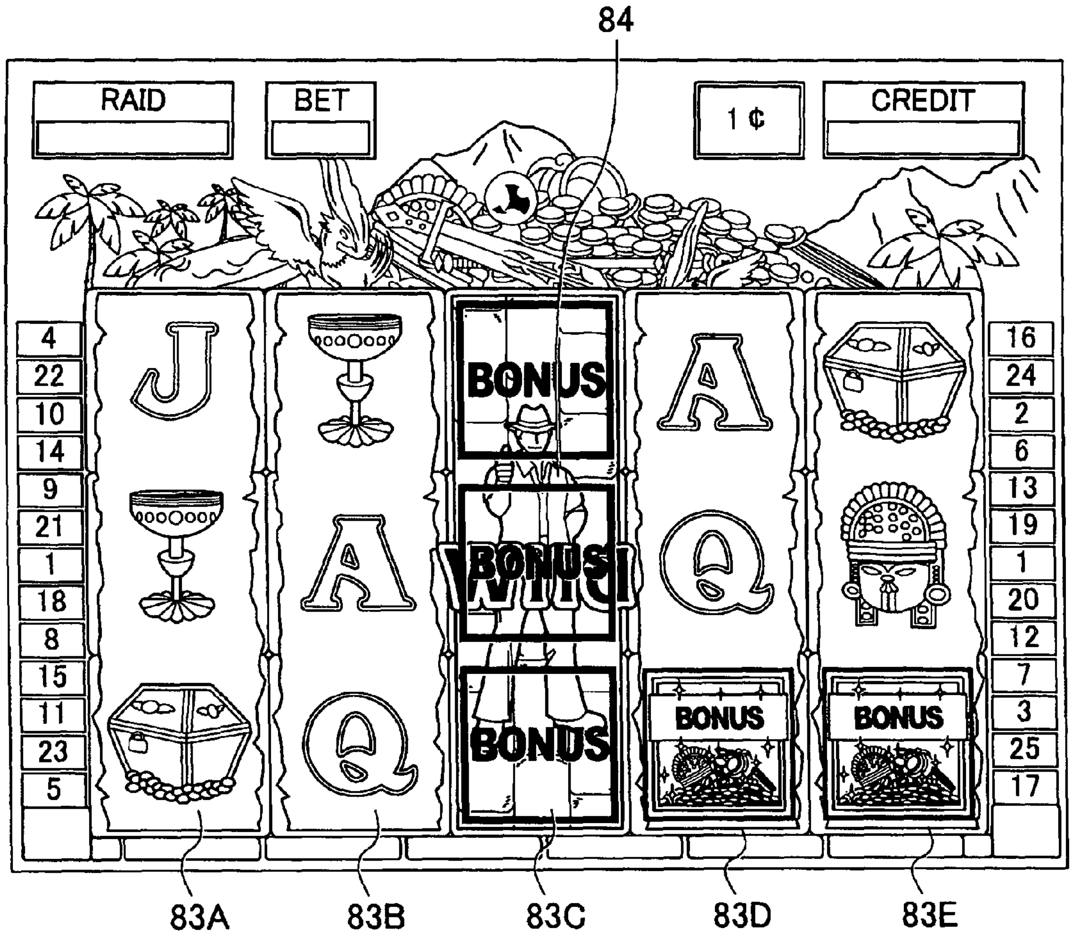
FIG. 21 is a view showing a screen displaying bonus establishment.

On the other hand, shifting to step S15, the CPU 106 performs processing of causing the liquid crystal display device 30 to display, on the screen 31*a*, an image indicating that the BONUS is realized as shown in FIG. 21, and then the CPU 106 shifts the processing to step S17.

FIG. 21 shows an aspect indicating that the CPU 106 causes the liquid crystal display device 30 to display the realization of the BONUS when the CPU 106 receives the selection by the player of replacing the third reel with the Wild symbol. Here, in the high probability mode, since the Wild symbol substitutes the BONUS trigger and three BONUS symbols are completed on the activated lines, the BONUS is realized.

Then, the speaker 41 outputs a hero's voice "Oh Yay!!" in synchronization with the display of the image in which the BONUS is realized.

Shifting to step S17, the CPU 106 performs free game processing. After the completion of the free game processing, the CPU 106 exits the routine.

According to the present embodiment, the following operation and effects may be provided.

The slot machine 10 comprises: touch switch operation means (touch panel 32) for causing the predetermined region of the image display means (liquid crystal display device 30) to function as the touch switch for receiving the selection operation for selecting a reel, as a prescribed area of the image display means (for example, mechanical reels 3A to 3E), among all the stopped reels at a position where a stopped symbol in a display window is to be replaced with the Wild symbol when the game mode is shifted to the high probability mode as a result of the internal lottery for shifting to the high probability mode, and symbol replace means (for example, static display areas 83A to 83E) for replacing visually the symbols of one reel designated according to the selection having received with the Wild symbol by displaying the Wild symbol to superimpose and cover the static display area of the symbols in the display window of the one reel corresponding to the received selection having been operated on the screen 31*a* of the image display means (liquid crystal display device 30) as is triggered by receiving the reel selection operation utilizing the touch panel 32, wherein the game control means (CPU 106) can determine the winning combination by regarding the stopped symbols of the one reel selected through the symbol replace means (for example, the static display areas 83A to 83E) as the Wild symbol when the winning combination is determined.

Thus, when the symbols of all the reels are stopped and displayed in all symbol display means (for example, the mechanical reels 3A to 3E) during the high probability mode, it is possible to receive the selection operation of the reel at the position to be replaced with the Wild symbol and to determine the winning combination by regarding the stopped symbols on the one reel having selected as the Wild symbol when the winning determination is conducted.

As a result, the final winning mode of the winning combination is changed by replacing the symbols on the reel stopped and displayed by the symbol display means (for example, one of the mechanical reels 3A to 3E), which is selected based on a player's own intention, with the Wild symbol. Thus, according to the configuration of the present invention, even if it is actually determined in advance to win or to lose, it is possible to cause the player to feel as if a player's own selection operation engages with the progress of the game. According to the configuration of the present invention, it is possible to provide the slot machine 10 capable of exciting player's interest and increasing player's expectancy by producing such an operation effect.

Further, the present invention is not limited to the above embodiment.

According to the above embodiment, the game control means (CPU 106) determines the winning combination by regarding, only for the current game, the symbols on the reel replaced with the Wild symbol in the high probability mode during the game. However, the present invention is not limited to the embodiment. For example, when there exists no winning combination established even if the symbols on the selected reel are replaced with the Wild symbol in one game (when the game is lost or a blank), the series of games may be configured such that the symbols on the reel replaced with the Wild symbol are kept replaced until the next game following the one game ends.

In this manner, it is possible for the player to have an interest in the game and an expectation so as to get higher probability to get the winning combination in the following game even if the player selects the Wild symbol and the current game is lost (or the blank) in the high probability mode.

In the above embodiment, all symbols on the one reel selected by the player are replaced with the Wild symbol in the high probability mode, but the present invention is not limited thereto. For example, the replacement by the Wild symbol may not be made for one reel but for each symbol such that one symbol on any one of the plurality of reels is replaced with the Wild symbol.

Here, although the number of symbols replaced with the Wild symbol is not particularly limited, it is preferable that the maximum number of replaced symbols is three. Because the number of symbols displayed on the one reel is three when the reel stops, and at this time, the number of symbols which can be replaced with the Wild symbol is three if the replacement is to be conducted for the one reel. In order to prevent the game from being won in any case as a result of replacing a plurality of symbols on the activated lines with the Wild symbols, it is preferable to restrict that only one symbol can be replaced with the Wild symbol on the activated lines.

In this manner, variations in selecting symbols to be replaced with the Wild symbol increase, and it is expectable that the player may think hard of getting more game media. Therefore, it is possible for the player to enjoy the game with much more interest and higher expectancy.

According to the above embodiment, the CPU 106 causes the plurality of reels to stop automatically in a predetermined order in the high probability mode, but the present invention is not limited thereto. For example, the slot machine 10 includes a plurality of stop buttons provided corresponding to respective reels for stopping the rotation of the respective reels, and the CPU 106 may cause each reel to stop sequentially according to the order of the press operation of the observation push by the player.

A stop instruction for each reel by the CPU 106 is issued based on the player's own intention, and it is thus expected that the player may concentrate on the observation push to try to get more game media. Therefore, the player may enjoy the game with much more interest and higher expectancy.

Although the above embodiment describes an example in which the present invention is applied to a mechanical reel slot machine, the present invention can be applied also to a so-called simulation reel slot machine. This means that the present invention is not limited in the modes of variable display and static display of the symbols.

In the above embodiment, the description is given of an example in which the present invention is applied to the slot machine that has no stop buttons and automatically stops the rotation of the reels after the rotation is made (a so-called casino machine). However, it is possible to apply the present invention also to a slot machine (a so-called pachi-slot machine) provided with a stop button or stop buttons, in which the reels are stopped sequentially according to the order of conducting the observation push, which implies that the present invention is not limited by the static display mode of symbols.

In addition to the above embodiments, the following embodiment is also explained with reference to the FIGS. 23 to 26. Notwithstanding the above description, in the following embodiment, the winning combination may be defined as follows:

(A) Four of One Kind

If a certain symbol such as snake, treasure box, gold mask, grail, compass and map, ace, king, queen, Jack, and 10 appears four or more times on the activated line, it is the winning combination of the certain symbol.

(B) Five of One Kind

If a certain symbol such as snake, treasure box, gold mask, grail, compass and map, ace, king, queen, Jack, and 10 appears five times on the activated line, it is the winning combination of the certain symbol.

Here, the above (A) or (B) definition may be used alternatively such that the game can have two levels in the difficulty. The payout rate of each winning combination is based on the table shown in FIG. 22.

Figure 23:
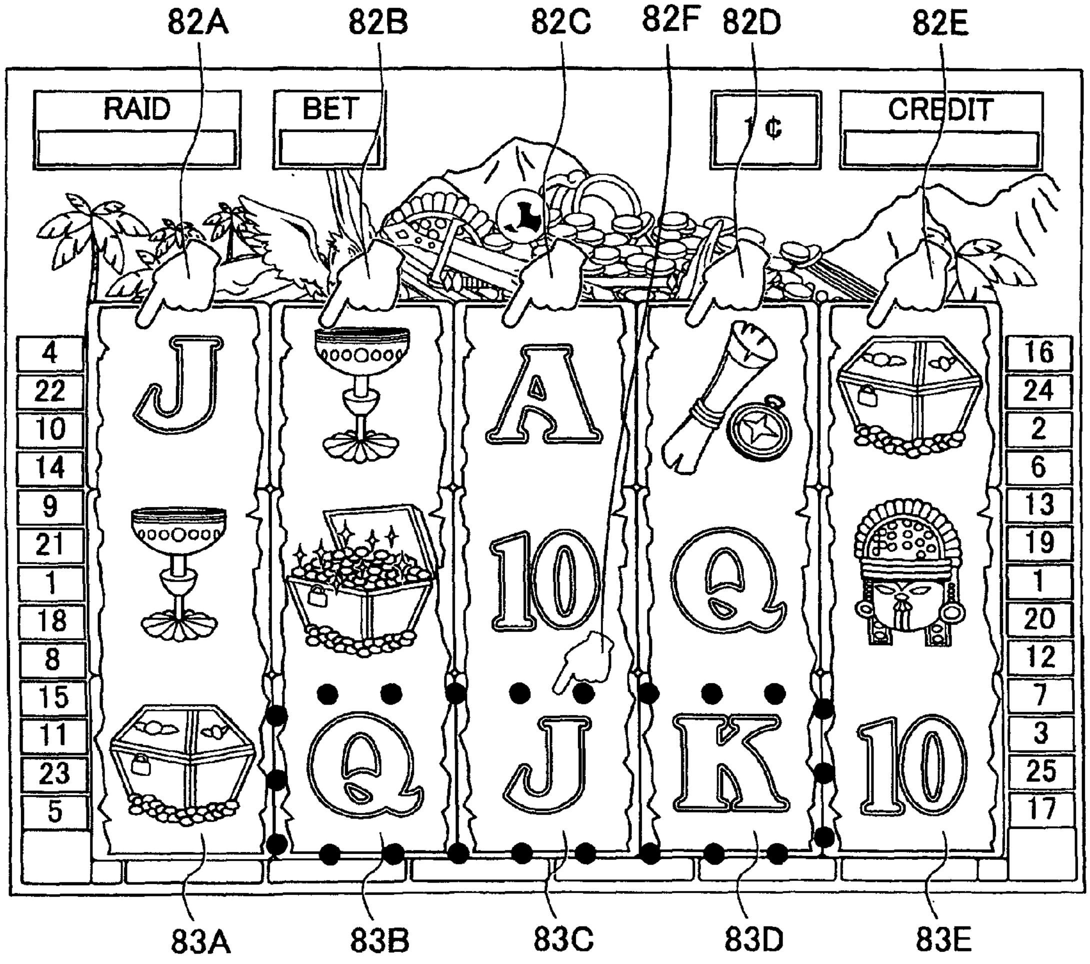
FIG. 23 is a view showing a symbol selection screen with three symbols along the horizontal line.
Figure 24:
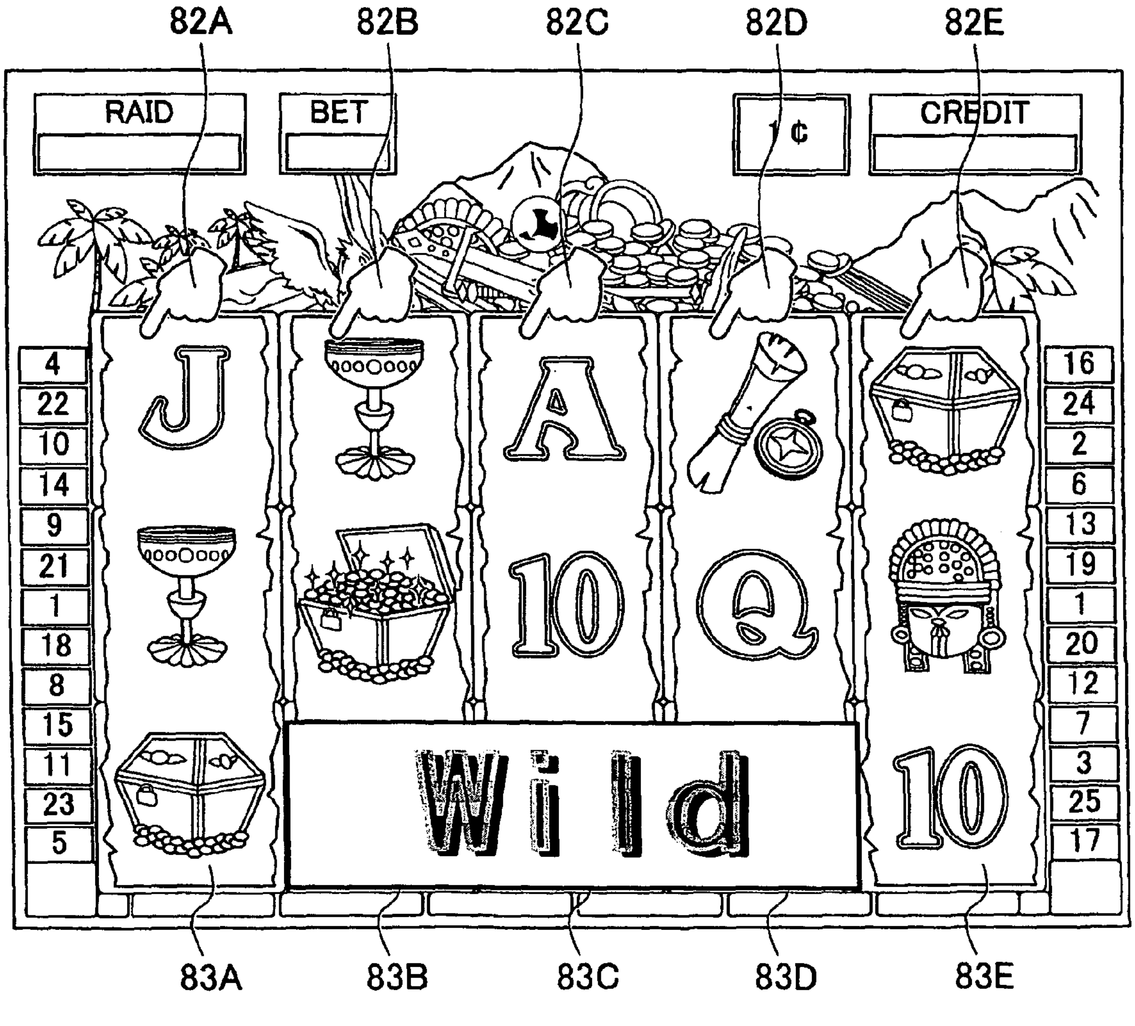
FIG. 24 is a view showing a screen displaying replacement with Wild symbol.

FIGS. 23 and 24 show an aspect indicating that the CPU 106 receives the selection of an area of the display windows to be replaced with the Wild symbol by the player via the screen 31*a*, after the mechanical reels 3A to 3E stop. Here, the display windows are composed of three areas to be made transmissive to show symbols on the reels 3A to 3E therethrough. Each display window may be framed by four sides so as to show a symbol statically. In FIGS. 23 and 24, for example, three display windows are connected vertically to be framed in a rectangular as a whole such that the variable display of symbols can be made in one rectangular frame. That is the three display windows are installed in the vertically-long rectangular frame. The CPU 106 causes the liquid crystal display device 30 to display hand images (or hand marks) 82A to 82F on the screen 31*a* so as to touch each hand image in the static display areas 83A to 83E. Therefore, the screen 31*a* can function as the touch panel 32, and the CPU 106 can receive the selection of the reel to be replaced with the Wild symbol when the player presses the hand images 82A to 82F. In this embodiment, the same procedures shown in FIGS. 9 and 10 are carried out.

Thus, the player can recognize that the screen 31*a* functions as a touch switch (touch panel 32), and a symbol or a symbol area to be replaced with the Wild symbol can be selected by touching the hand images with the finger. As compared with the screen shown in FIG. 14, a new area enclosed by the dotted rectangular which is pointed by the hand image 82F. In this embodiment, the symbols to be replaced with Wild symbol are three aligned to a horizontal line such that it is definite to obtain any of the winning combination along the L7 (refer to FIG. 2) if the (A) type of definition of the winning combination is employed. Therefore, the probability to win the winning combination is more likely depending on the selection of activated lines since if only the lines L3 and L5 are activated, none of the symbols on the activated lines are replaced with Wild symbol. After the processing of step S10 is completed, the CPU 106 shifts the processing to step S11.

Shifting to step S11, the CPU 106 determines whether or not any one of reels is selected by the operation of the player via the touch panel 32. When the determination is YES, the CPU 106 shifts to step S12, and when the determination is NO, the CPU 106 repeats the processing of step S11 until it is determined to be YES.

Shifting to step S12, the CPU 106 performs processing of displaying an image in which a character is made to appear on the screen 31*a* of the liquid crystal display device 30.

Figure 25:
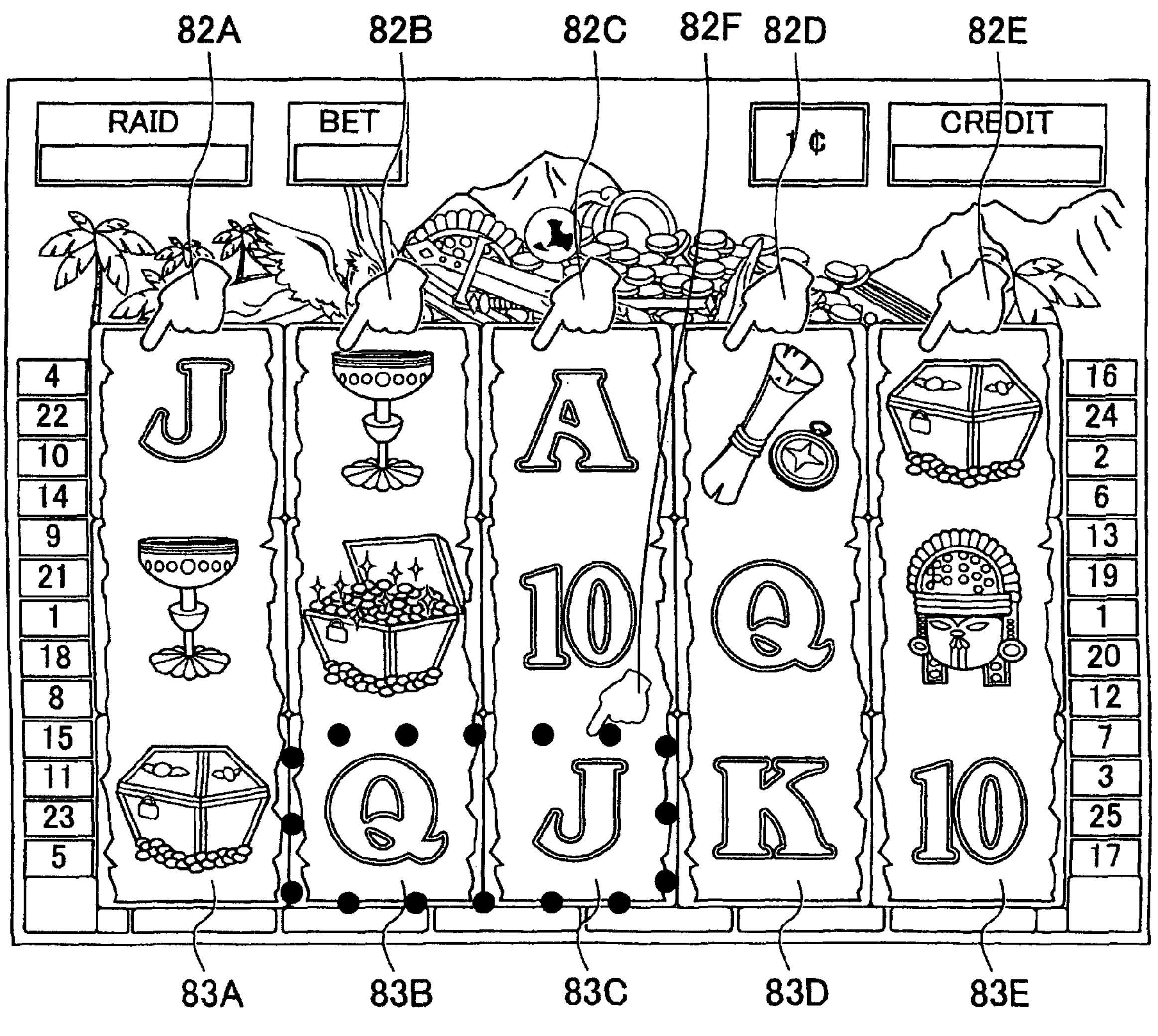
FIG. 25 is a view showing a symbol selection screen with two symbols along the horizontal line.
Figure 26:
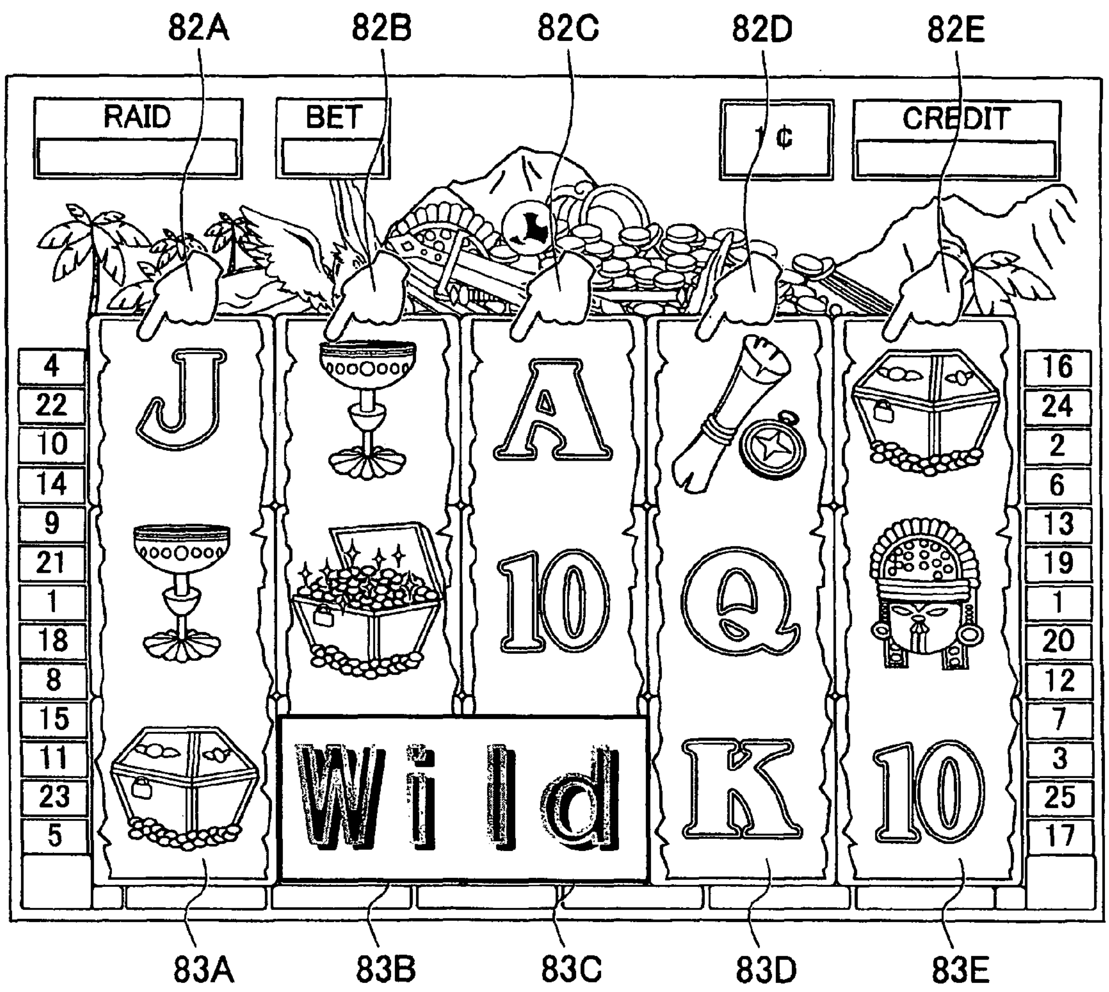
FIG. 26 is a view showing a screen displaying replacement with Wild symbol.

FIGS. 25 and 26 show another embodiment with two symbols on the lower row. In a similar manner, the dotted rectangular area can be selected by touching the hand image 82F. And it may be more effective than selecting a column depending on which lines are activated by the player.

Similarly, it is possible to pick one symbol in the display windows 83A to 83E. In such a case, it is less likely to obtain the winning combination.

As mentioned above, the possible winning combination may be determined before selecting the area. But, there is a possibility to change the most profitable winning combination by choosing the symbols or the column for replacement with Wild symbol.

If the column is selected for the symbol replacement, it is possible to be benefited by the replacement since any of the activated lines cross any one of the columns. However, if one or more symbols in a part of row are replaced with Wild symbol, the player may want to be careful in choosing the symbols for replacement since the activated lines may not or less activated lines cross the symbols the player selected. For example, the lines L2, L4, L5, L6, and L8 cross the centered symbol of "A", such that the upper or lower symbol "grail" or "Queen" may not be appropriate for the selection.

In consideration of the aforementioned explanation, the following example, to which the definition made in the above added example may not be applied, may also be included according to the present invention.

(1) A slot machine comprising: a plurality of symbol display means (e.g., mechanical reels 3A to 3E) for displaying a plurality of kinds of symbols; a plurality of symbol variable control means for causing the symbol display means to conduct variable display and static display; game start reception means for receiving, for one game, a start operation of the game by a player; first lottery means for conducting an internal lottery to determine a final static symbol appearing mode under a condition that the start operation of the game is received by the game start reception means; second lottery means for conducting an internal lottery to determine whether to shift the game into a high probability mode in which a probability to shift the game into a bonus winning is higher when a specific condition is satisfied; game control means for conducting the game, which determines the final static symbol appearing mode by causing the first lottery means to conduct a static symbol determining internal lottery as triggered by the game start reception means receiving the start operation of the game, which starts the variable display of the symbol display means by the plurality of symbol variable control means, which then stops the variable display of the symbol display means by the plurality of symbol variable control means based on the static symbol determining internal lottery after starting the variable display, and which reads out a game program to provide game media corresponding to a winning combination when a combination of stopped symbols indicates the winning combination; image display means comprising an area corresponding to and covering display windows, the area to be made a transmissive area such that the variable and static displays of symbols of the respective symbol display means can be observed visually; switch means for causing a predetermined area of the image display means to function as a touch switch, which receives a selection operation to select the symbol display means provided on a position for replacing static symbols with a specific symbol capable of substituting any kind of symbols in the display windows of the symbol display means in a static mode, when the symbols on the symbol display means are displayed statically by the symbol variable control means, in a case that the game is shifted to the high probability mode as a result of the high probability mode shift internal lottery by the second lottery means; and symbol replacement means for replacing visually a symbol of the selected symbol display means with the specific symbol by overlaying the specific symbols to cover a static display area of the symbol in the display windows of the symbol display means having been selected on a display face of the image display means as triggered by the symbol display means receiving the selection operation utilizing the switch means. The game control means of the slot machine determines the winning combination by regarding a stopped symbol of the symbol display means having been selected through the symbol replacement means as a specific symbol (e.g., wild symbol) that can be any kind of symbol at the winning determination time.

The slot machine as configured above, comprises: switch means for causing a predetermined area of the image display means to function as a touch switch, which receives a selection operation to select the symbol display means provided on a position for replacing static symbols with a specific symbol capable of substituting any kind of symbols in the display windows of the symbol display means in a static mode, when the symbols on the symbol display means are displayed statically by the symbol variable control means, in a case that the game is shifted to the high probability mode as a result of the high probability mode shift internal lottery by the second lottery means; and symbol replacement means for replacing visually a symbol of the selected symbol display means with the specific symbol by overlaying the specific symbols to cover a static display area of the symbol in the display windows of the symbol display means having been selected on a display face of the image display means as triggered by the symbol display means receiving the selection operation utilizing the switch means, such that the slot machine may show an operation effect that the game control means can determine the winning combination by regarding a stopped symbol of the symbol display means having been selected through the symbol replacement means as a specific symbol that can be any kind of symbol at the winning determination time.

In this way, it is possible to receive the selection operation of the symbol display means at a position where a symbol, to be replaced the specific symbol, is statically displayed when symbols of symbol display means are displayed statically by the symbol variable control means in the high probability mode such that the winning combination can be determined by regarding the statically-displayed symbol of the symbol display means as the specific symbol.

As a result, the symbol of the symbol display means is replaced with the specific symbol based on the player's intention in the high probability mode such that the final winning combination may be changed. In this way, according to the configuration of the present invention, the player may have a feeling that the player is involved in the game progress by the player's own selecting operation, even though the actual winning has been already determined, in the high probability mode where the player's expectation is enhanced more than the basic mode.

Further, the above effect performance can have an effect to notify the player that the game is shifted to the high probability mode. Therefore, the player plays the game expecting such an effect performance even in the base game mode so as to have higher expectation of shifting to the high probability mode.

And, it is suggested by changing the color of the lamp or the display screen that the player plays the game in the high probability mode. However, in the present invention, the player can have a real feeling that the winning probability is increased by overlaying the specific symbol which can be a part of all winning combinations over the display area in the display window corresponding to the selected symbol display means. That is, if the specific symbol is superimposed over the display area in the display window corresponding to the symbol display means, the stopped symbol over which the specific symbol is superimposed will not affect the winning combination such that the slot machine performs the effect that the player can play the game expecting the highest winning combination among the winning combinations having other symbols of the other symbol display means. According to the configuration of the present invention, it is possible to provide a slot machine which can perform such effects so as to attract the player's interest and enhance the player's expectation.

(2) The slot machine according to (1), comprising: third lottery means for conducting an internal lottery to determine whether or not to receive the selection operation as triggered by the game start reception means receiving the start operation of the game.

The slot machine as configured above further comprises: third lottery means for conducting an internal lottery to determine whether or not to receive the selection operation as triggered by the game start reception means receiving the start operation of the game.

In this way, it is possible to determine whether the symbol display means that is replaced with the specific symbol can be selected or not at the time when the start operation of the game is received in the high probability mode.

As a result, in the high probability mode, it is possible to provide the player with the interest and expectation for each game since it is changeable whether the symbol display means to be replaced with the specific symbol can be selected or not depending on the result of the internal lottery by the third lottery means as it is determined by the first lottery means whether the final winning combination is obtained or not for each game in the high probability mode.

(3) The slot machine according to (1) or (2), wherein the symbol replacement means conducts an effect that a character image appears at a position of the static display area of the symbol display means having been selected on a display face of the image display means as triggered by the reception of the selection operation in order to show the selection operation is effective, and the effect image on a display face of the image display means is displayed in order to suggest to receive the selection operation before symbols of the symbol display means are displayed statically by the symbol variable control means.

The slot machine as configured above is characterized in that the symbol replacement means conducts an effect that a character image appears at a position of the static display area of the symbol display means having been selected on a display face of the image display means as triggered by the reception of the selection operation in order to show the selection operation is effective, and the effect image on a display face of the image display means is displayed in order to suggest to receive the selection operation before symbols of the symbol display means are displayed statically by the symbol variable control means.

In this way, the player can be notified whether the symbol display means to be replaced with the specific symbol can be selected or not before stopping all symbol display means and further confirm that the selection operation has been effective by viewing the character appearing after the selection.

As a result, it is possible to notify the player visually in a direct and easy manner of the chance to replace the symbol with the specific symbol provided by the slot machine in the high probability mode. And such effect performance itself may entertain the player with interest and expectation.

(4) The slot machine according to any one of (1) to (3), wherein the symbol replacement means replaces visually the symbol of the symbol display means having been selected with the specific symbol only when the switch means receives the selection operation within a predetermined period of time from when the static display of all symbol display means is made by the symbol variable control means.

The slot machine as configured above performs an effect that the symbol replacement means can replace visually the symbol of the symbol display means having been selected with the specific symbol only when the switch means receives the selection operation within a predetermined period of time from when the static display of all symbol display means is made by the symbol variable control means.

In this way, the specific symbol can be displayed only when the switch means receives the selection operation within a limited period of time in the high probability mode.

As a result, since the specific symbol is not displayed when the player does not select the symbol display means to be replaced with the specific symbol within the limited period of time in the high probability mode, the player is expected to focus on trying to make a better selection in consideration of the effects of replacement with the specific symbol. Therefore, it is possible to attract the player's interest and enhance the player's expectation.

Here, there is a case (i.e., the case where the replacement with the specific symbol is not necessary) where the amount of game media the player can obtain is not increased no matter how the replacement with the specific symbol is conducted depending on the game in the high probability mode. Because of this, the player obtains the same number of game media whether or not the player selects the symbol display means to be replaced with the specific symbol within the limited period of time. Therefore, the player may think of playing the game to make a good selection to obtain more payout as well as make no selection. Therefore, the slot machine may provide the player with another kind of amusement such that the player can devote himself or herself into the game.

(5) A slot machine comprising: a plurality of symbol display means for displaying a plurality of kinds of symbols; a plurality of symbol variable control means for causing the symbol display means to conduct variable display and static display; game start reception means for receiving, for one game, a start operation of the game by a player; first lottery means for conducting an internal lottery to determine a final static symbol appearing mode under a condition that the start operation of the game is received by the game start reception means; second lottery means for conducting an internal lottery to determine whether to shift the game into a high probability mode in which a probability to shift the game into a bonus winning is higher when a specific condition is satisfied; game control means for conducting the game, which determines the final static symbol appearing mode by causing the first lottery means to conduct a static symbol determining internal lottery as triggered by the game start reception means receiving the start operation of the game, which starts the variable display of the symbol display means by the plurality of symbol variable control means, which then stops the variable display of the symbol display means by the plurality of symbol variable control means based on the static symbol determining internal lottery after starting the variable display, and which reads out a game program to provide game media corresponding to a winning combination when a combination of stopped symbols indicates the winning combination; image display means comprising an area corresponding to and covering display windows, the area to be made a transmissive area such that the variable and static displays of symbols of the respective symbol display means can be observed visually; touch switch operation means for causing a predetermined area of the image display means to function as a touch switch, which receives a selection operation to select the symbol display means provided on a position for replacing static symbols with a specific symbol capable of constituting a part of the winning combination of symbols in the display windows of the symbol display means in a static mode, when the symbols on the symbol display means are displayed statically by the symbol variable control means, in a case that the game is shifted to the high probability mode as a result of the high probability mode shift internal lottery by the second lottery means; and symbol replacement means for replacing visually a symbol of the selected symbol display means with the specific symbol by overlaying the specific symbols to cover a static display area of the symbol in the display windows of the symbol display means having been selected on a display face of the image display means as triggered by the symbol display means receiving the selection operation utilizing the switch means, wherein the game control means determines the winning combination by regarding a stopped symbol of the symbol display means having been selected through the symbol replacement means at the winning determination time as the specific symbol.

The slot machine as configured above comprises: touch switch operation means for causing a predetermined area of the image display means to function as a touch switch, which receives a selection operation to select the symbol display means provided on a position for replacing static symbols with a specific symbol capable of constituting a part of the winning combination of symbols in the display windows of the symbol display means in a static mode, when the symbols on the symbol display means are displayed statically by the symbol variable control means, in a case that the game is shifted to the high probability mode as a result of the high probability mode shift internal lottery by the second lottery means; and symbol replacement means for replacing visually a symbol of the selected symbol display means with the specific symbol by overlaying the specific symbols to cover a static display area of the symbol in the display windows of the symbol display means having been selected on a display face of the image display means as triggered by the symbol display means receiving the selection operation utilizing the switch means, and the slot machine can perform the effect that the game control means determines the winning combination by regarding a stopped symbol of the symbol display means having been selected through the symbol replacement means at the winning determination time as the specific symbol.

In this way, it is possible to receive the selection operation of the symbol display means at a position where a symbol to be replaced with the specific symbol is displayed statically when the symbols of all symbol display means are displayed statically by all symbol variable control means in the high probability mode. It is possible to determine the winning combination by regarding the static symbol of the symbol display means having been selected at the winning determination time as the specific symbol.

As a result, the winning combination mode can be changed by replacing the symbol of the selection symbol display means based on the player's intention in the high probability mode. Thus, the configuration according to the present invention enables the player to have a feeling that the player's own selection operation involves the game progress even though it is actually already determined whether the winning combination is established or not in the high probability mode in which the player has higher expectation than in the base mode.

Further, the above effect performance can have an effect to notify the player that the game is shifted to the high probability mode. Therefore, the player plays the game expecting such an effect performance even in the base game mode so as to have higher expectation of shifting to the high probability mode.

And, it is suggested by changing the color of the lamp or the display screen that the player plays the game in the high probability mode. However, in the present invention, the player can have a real feeling that the winning probability is increased by overlaying the specific symbol which can be a part of all winning combinations over the display area in the display window corresponding to the selected symbol display means. That is, if the specific symbol is superimposed over the display area in the display window corresponding to the symbol display means, the stopped symbol over which the specific symbol is superimposed will not affect the winning combination such that the slot machine performs the effect that the player can play the game expecting the highest winning combination among the winning combinations having other symbols of the other symbol display means. According to the configuration of the present invention, it is possible to provide a slot machine which can perform such effects so as to attract the player's interest and enhance the player's expectation.

(6) The slot machine according to (5), comprising: third lottery means for conducting an internal lottery to determine whether or not to receive the selection operation as triggered by the game start reception means receiving the start operation of the game.

The slot machine as configured above further comprises: third lottery means for conducting an internal lottery to determine whether or not to receive the selection operation as triggered by the game start reception means receiving the start operation of the game.

In this way, it is possible to determine whether the symbol display means that is replaced with the specific symbol can be selected or not at the time when the start operation of the game is received in the high probability mode.

As a result, in the high probability mode, it is possible to provide the player with the interest and expectation for each game since it is changeable whether the symbol display means to be replaced with the specific symbol can be selected or not depending on the result of the internal lottery by the third lottery means as it is determined by the first lottery means whether the final winning combination is obtained or not for each game in the high probability mode.

(7) The slot machine according to (5) or (6), wherein the symbol replacement means conducts an effect that a character image appears at a position of the static display area of the symbol display means having been selected on a display face of the image display means as triggered by the reception of the selection operation in order to show the selection operation is effective, and the effect image on a display face of the image display means is displayed in order to suggest to receive the selection operation before symbols of the symbol display means are displayed statically by the symbol variable control means.

The slot machine as configured above is characterized in that the symbol replacement means conducts an effect that a character image appears at a position of the static display area of the symbol display means having been selected on a display face of the image display means as triggered by the reception of the selection operation in order to show the selection operation is effective, and the effect image on a display face of the image display means is displayed in order to suggest to receive the selection operation before symbols of the symbol display means are displayed statically by the symbol variable control means.

In this way, the player can be notified whether the symbol display means to be replaced with the specific symbol can be selected or not before stopping all symbol display means and further confirm that the selection operation has been effective by viewing the character appearing after the selection.

As a result, it is possible to notify the player visually in a direct and easy manner of the chance to replace the symbol with the specific symbol provided by the slot machine in the high probability mode. And such effect performance itself may entertain the player with interest and expectation.

(8) The slot machine according to any one of (5) to (7), wherein the symbol replacement means replaces visually the symbol of the symbol display means having been selected with the specific symbol only when the touch switch operation means receives the selection operation within a predetermined period of time from when the static display of all symbol display means is made by the symbol variable control means.

The slot machine as configured above performs an effect that the symbol replacement means can replace visually the symbol of the symbol display means having been selected with the specific symbol only when the touch switch operation means receives the selection operation within a predetermined period of time from when the static display of all symbol display means is made by the symbol variable control means.

In this way, the specific symbol can be displayed only when the touch switch operation means receives the selection operation within a limited period of time in the high probability mode.

As a result, since the specific symbol is not displayed when the player does not select the symbol display means to be replaced with the specific symbol within the limited period of time in the high probability mode, the player is expected to focus on trying to make a better selection in consideration of the effects of replacement with the specific symbol. Therefore, it is possible to attract the player's interest and enhance the player's expectation.

Here, there is a case (i.e., the case where the replacement with the specific symbol is not necessary) where the amount of game media the player can obtain is not increased no matter how the replacement with the specific symbol is conducted depending on the game in the high probability mode. Because of this, the player obtains the same number of game media whether or not the player selects the symbol display means to be replaced with the specific symbol within the limited period of time. Therefore, the player may think of playing the game to make a good selection to obtain more payout as well as make no selection. Therefore, the slot machine may provide the player with another kind of amusement such that the player can devote himself or herself into the game.

According to the present invention, since the player can select the static symbol of the symbol display means replaced with the specific symbol that can substitute all kinds of symbols after stopping all symbol display means in the high probability mode, it is possible to provide a slot machine attracting the player's interest and satisfying the player's expectation.

As stated above, the embodiments of the present invention are explained by way of example. And the present invention is not limited to these and each means and concrete configuration thereof can be changed or modified without departing from the scope of the present invention. The described effects of the embodiments of the present invention are examples of preferable effects which may be caused by the present invention. Therefore, the effects of the present invention are not limited to those written with respect to the embodiments.

What is claimed is:

1. A slot machine comprising:

a plurality of symbol display means for displaying a plurality of kinds of symbols;

a plurality of symbol variable control means for causing the symbol display means to conduct variable display and static display;

game start reception means for receiving, for one game, a start operation of the game by a player;

first lottery means for conducting an internal lottery to determine a final static symbol appearing mode under a condition that the start operation of the game is received by the game start reception means;

second lottery means for conducting an internal lottery to determine whether to shift the game into a high probability mode in which a probability to shift the game into a bonus winning is higher when a specific condition is satisfied;

game control means for conducting the game, which determines the final static symbol appearing mode by causing the first lottery means to conduct a static symbol determining internal lottery as triggered by the game start reception means receiving the start operation of the game, which starts the variable display of the symbol display means by the plurality of symbol variable control means, which then stops the variable display of the symbol display means by the plurality of symbol variable control means based on the static symbol determining internal lottery after starting the variable display, and which reads out a game program to provide game media corresponding to a winning combination when a combination of stopped symbols indicates the winning combination;

image display means comprising an area corresponding to and covering a display window, the area to be made a transmissive area such that the variable and static displays of symbols of the respective symbol display means can be observed visually;

switch means for causing a predetermined area of the image display means to function as a touch switch, which receives a selection operation to select the symbol display means provided on a position for replacing static symbols with a specific symbol capable of substituting any kind of symbols in the display window of the symbol display means in a static mode, when the symbols on the symbol display means are displayed statically by the symbol variable control means, in a case where the game is shifted to the high probability mode as a result of the high probability mode shift internal lottery by the second lottery means; and symbol replacement means for replacing visually a symbol of the selected symbol display means with the specific symbol by overlaying the specific symbols to cover a static display area of the symbol in the display window of the symbol display means having been selected on a display face of the image display means as triggered by the symbol display means receiving the selection operation utilizing the switch means, wherein the game control means determines the winning combination by regarding a stopped symbol of the symbol display means having been selected through the symbol replacement means at the winning determination time as the specific symbol that can be any kind of symbols.

2. The slot machine according to claim 1, comprising: third lottery means for conducting an internal lottery to determine whether or not to receive the selection operation as triggered by the game start reception means receiving the start operation of the game.

3. The slot machine according to claim 1, wherein the symbol replacement means conducts an effect that a character image appears at a position of the static display area of the symbol display means having been selected on the display face of the image display means as triggered by the reception of the selection operation in order to show the selection operation is effective, and the effect image on the display face of the image display means is displayed in order to suggest to receive the selection operation before symbols of the symbol display means are displayed statically by the symbol variable control means.

4. The slot machine according to claim 1, wherein the symbol replacement means replaces visually the symbol of the symbol display means having been selected with the specific symbol only when the switch means receives the selection operation within a predetermined period of time from when the static display of all symbol display means is conducted by the symbol variable control means.

5. A slot machine comprising:

a plurality of symbol display means for displaying a plurality of kinds of symbols;

a plurality of symbol variable control means for causing the symbol display means to conduct variable display and static display;

game start reception means for receiving, for one game, a start operation of the game by a player;

first lottery means for conducting an internal lottery to determine a final static symbol appearing mode under a condition that the start operation of the game is received by the game start reception means;

second lottery means for conducting an internal lottery to determine whether to shift the game into a high probability mode in which a probability to shift the game into a bonus winning is higher when a specific condition is satisfied;

game control means for conducting the game, which determines the final static symbol appearing mode by causing the first lottery means to conduct a static symbol determining internal lottery as triggered by the game start reception means receiving the start operation of the game, which starts the variable display of the symbol display means by the plurality of symbol variable control means, which then stops the variable display of the symbol display means by the plurality of symbol variable control means based on the static symbol determining internal lottery after starting the variable display, and which reads out a game program to provide game media corresponding to a winning combination when a combination of stopped symbols indicates the winning combination;

image display means comprising an area corresponding to and covering a display window, the area to be made a transmissive area such that the variable and static displays of symbols of the respective symbol display means can be observed visually;

touch switch operation means for causing a predetermined area of the image display means to function as a touch switch, which receives a selection operation to select the symbol display means provided on a position for replacing static symbols with a specific symbol capable of constituting a part of the winning combination of symbols in the display window of the symbol display means in a static mode, when the symbols on the symbol display means are displayed statically by the symbol variable control means, in a case where the game is shifted to the high probability mode as a result of the high probability mode shift internal lottery by the second lottery means; and symbol replacement means for replacing visually a symbol of the selected symbol display means with the specific symbol by overlaying the specific symbols to cover a static display area of the symbol in the display window of the symbol display means having been selected on a display face of the image display means as triggered by the symbol display means receiving the selection operation utilizing the switch means;

wherein the game control means determines the winning combination by regarding a stopped symbol of the symbol display means having been selected through the symbol replacement means at the winning determination time as the specific symbol.

6. The slot machine according to claim 5, comprising: third lottery means for conducting an internal lottery to determine whether or not to receive the selection operation as triggered by the game start reception means receiving the start operation of the game.

7. The slot machine according to claim 5, wherein the symbol replacement means conducts an effect that a character image appears at a position of the static display area of the symbol display means having been selected on a display face of the image display means as triggered by the reception of the selection operation in order to show the selection operation is effective, and the effect image on a display face of the image display means is displayed in order to suggest to receive the selection operation before symbols of the symbol display means are displayed statically by the symbol variable control means.

8. The slot machine according to claim 5, wherein the symbol replacement means replaces visually the symbol of the symbol display means having been selected with the specific symbol only when the touch switch operation means receives the selection operation within a predetermined period of time from when the static display of all symbol display means is made by the symbol variable control means.

9. A slot machine comprising:

a plurality of display windows in which a plurality of symbols are displayed variably and statically;

at least one pay line across the display windows to connect a predetermined number of display windows, a winning combination of symbols being determined by symbol arrangement along the at least one pay line; and a processor operable in a base mode to:

cause the plurality of symbols displayed variably in the plurality of display windows;

cause the plurality of symbols displayed statically in the plurality of display windows;

determine the winning combination by the symbol arrangement along the at least one pay line so as to shift a game mode to a high probability mode for a predetermined winning combination; and the processor operable in the high probability mode where a probability to win is higher than in the base mode to:

cause the plurality of symbols displayed variably in the plurality of display windows;

cause the plurality of symbols displayed statically in the plurality of display windows;

let a player select an area where at least one symbol is displayed statically and which covers at least partially a display window;

cause each symbol displayed statically in the selected area to be replaced with a specific symbol which can be a substitute symbol of any kind; and determine the winning combination by the symbol arrangement including the replacing specific symbol along the at least one pay line.

10. The slot machine according to claim 9, wherein the plurality of display windows form a matrix with a plurality of columns and a plurality of rows such that each of the at least one pay line connects one display window in each column to cross the matrix, wherein the symbols are displayed variably in each column; and wherein the selected area covers one column in the matrix.

11. The slot machine according to claim 9, wherein the plurality of display windows form a matrix with a plurality of columns and a plurality of rows such that each of the at least one pay line connects one display window in each column to cross the matrix, wherein the symbols are displayed variably in each column; and wherein the selected area covers two display windows connected in a row direction.

12. The slot machine according to claim 9, wherein the processor in the high probability mode is operable to determine the winning combination by an internal lottery.

13. The slot machine according to claim 9, wherein the processor in the high probability mode is operable to determine the winning combination by recognizing symbols actually shown along the at least one pay line as each column is independently stopped and the replacing specific symbol is shown in the selected area.

* * * * *